April 4, 1967     T. B. ATANASOFF ET AL     3,312,358
OVERHEAD TROLLEY SYSTEM FOR POSTAL SORTING APPARATUS
Filed Jan. 28, 1964     13 Sheets-Sheet 3
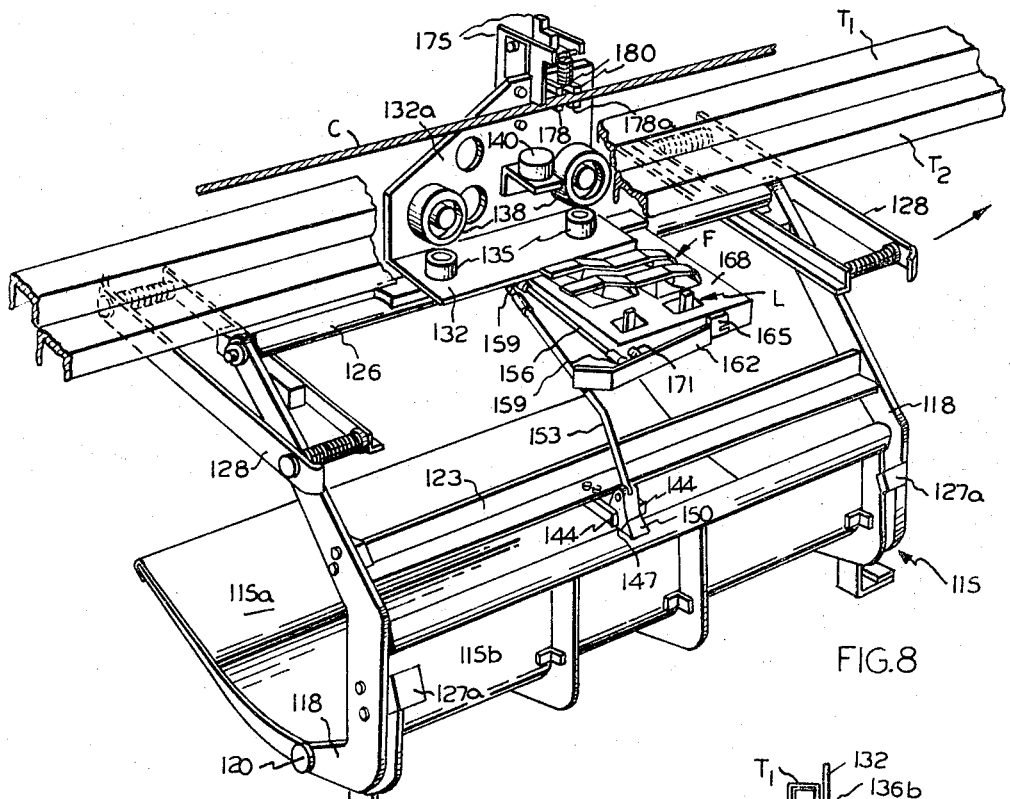
FIG.8
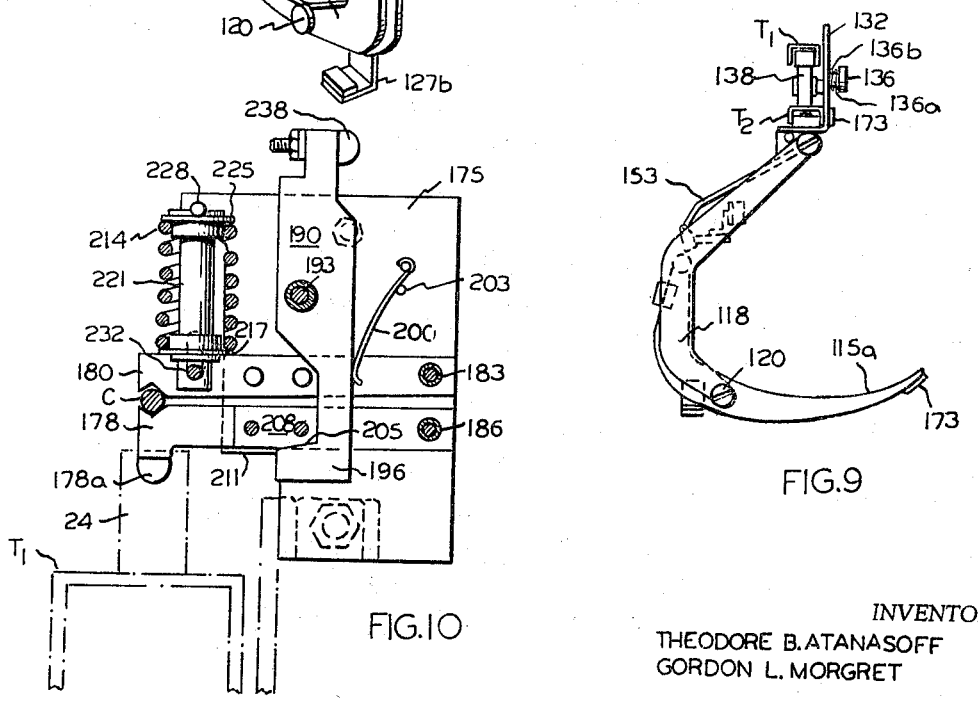
FIG.10     FIG.9
INVENTORS
THEODORE B. ATANASOFF
GORDON L. MORGRET
BY 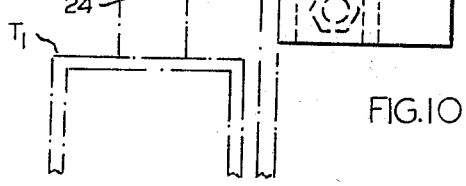
ATTORNEY

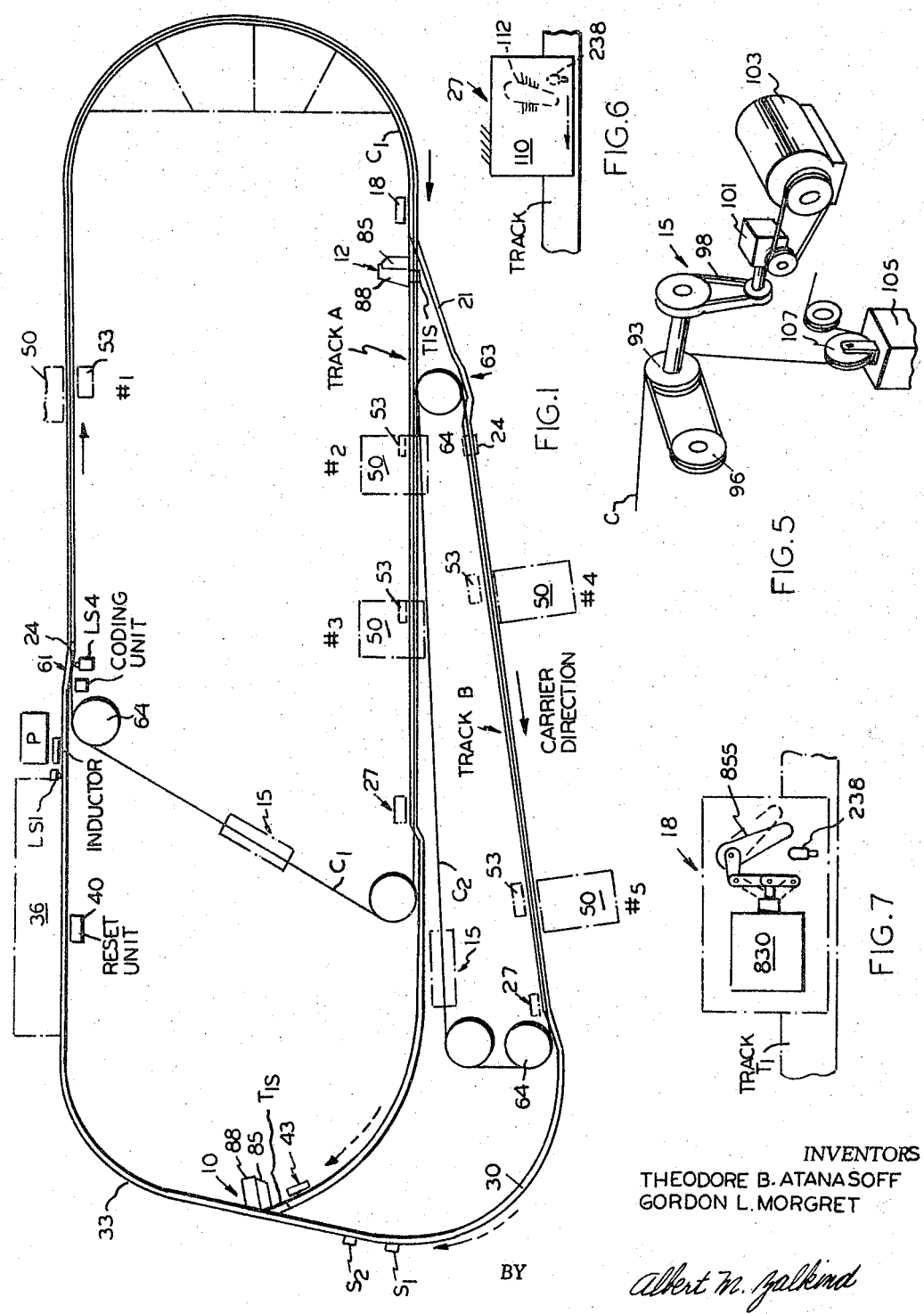

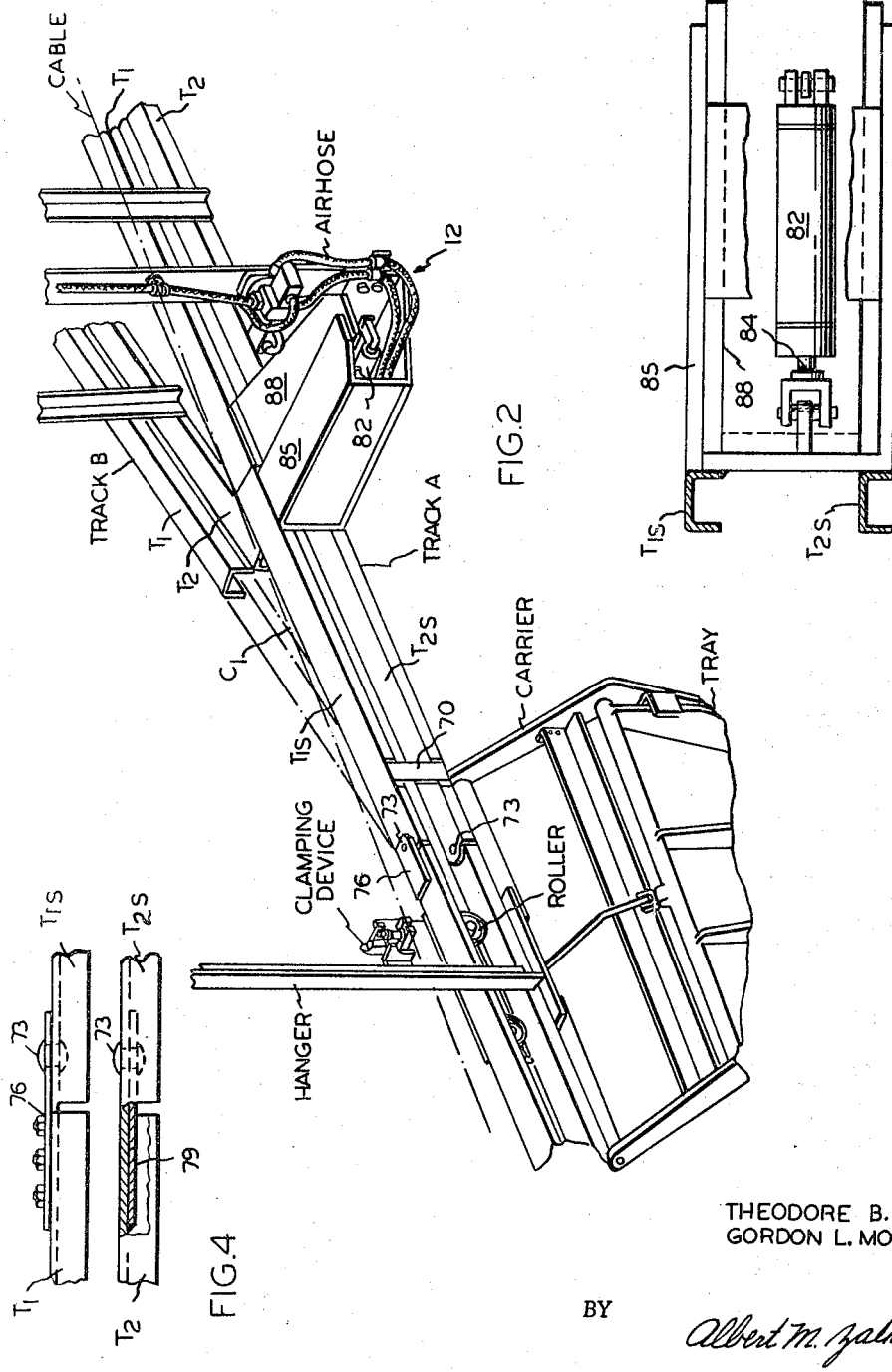

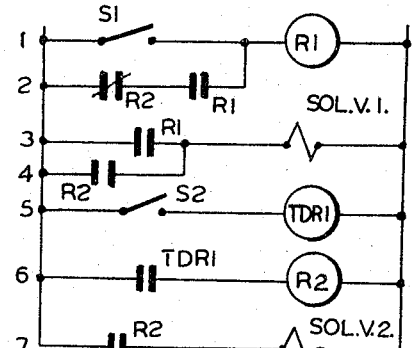
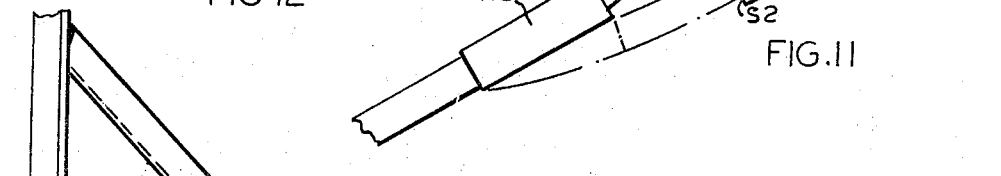
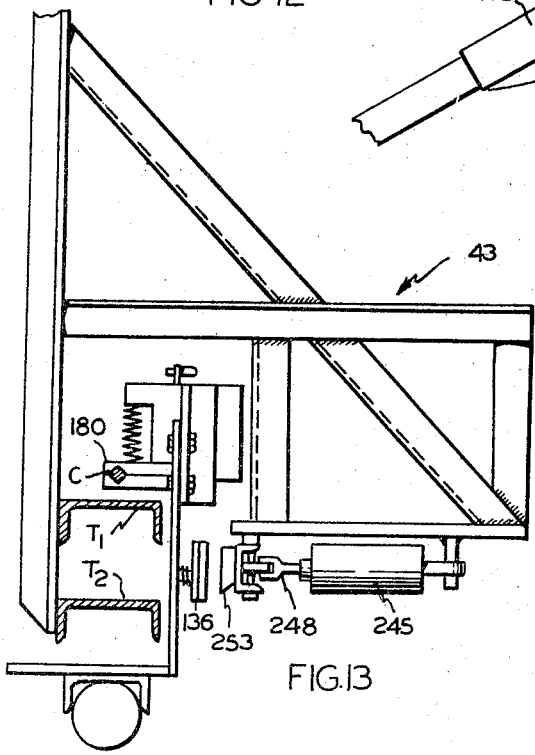
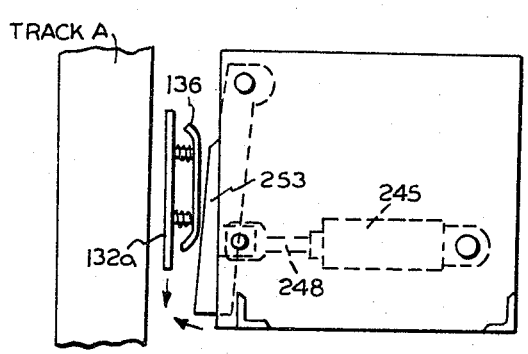
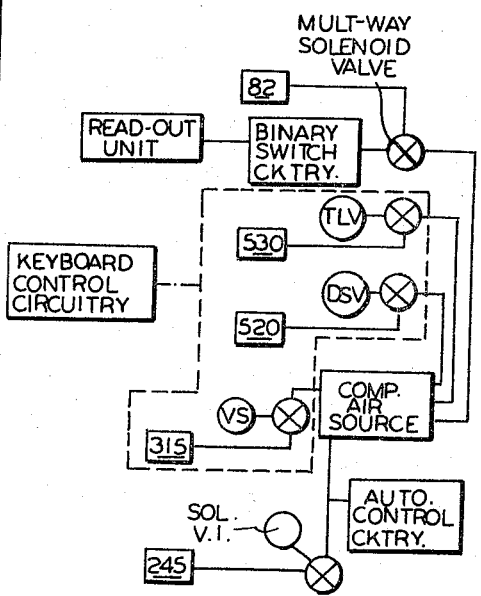

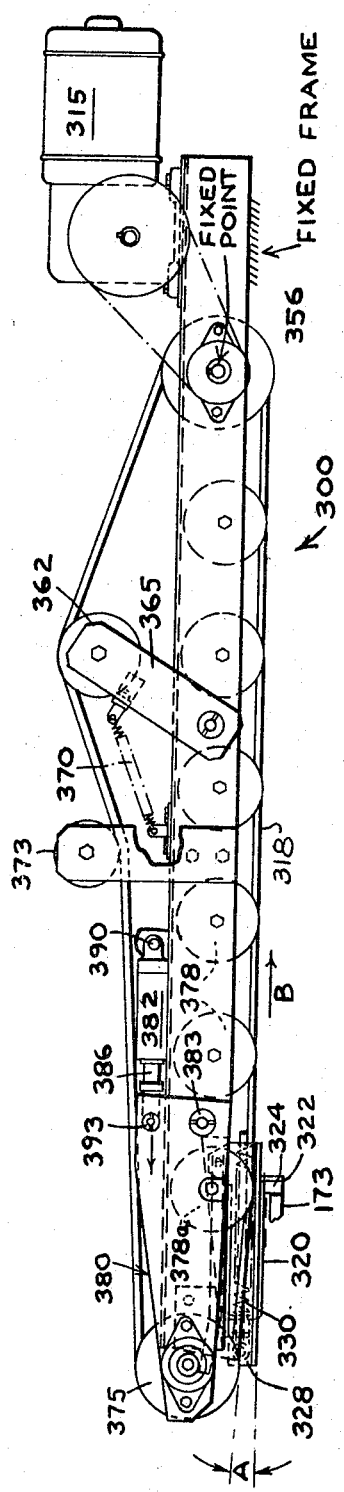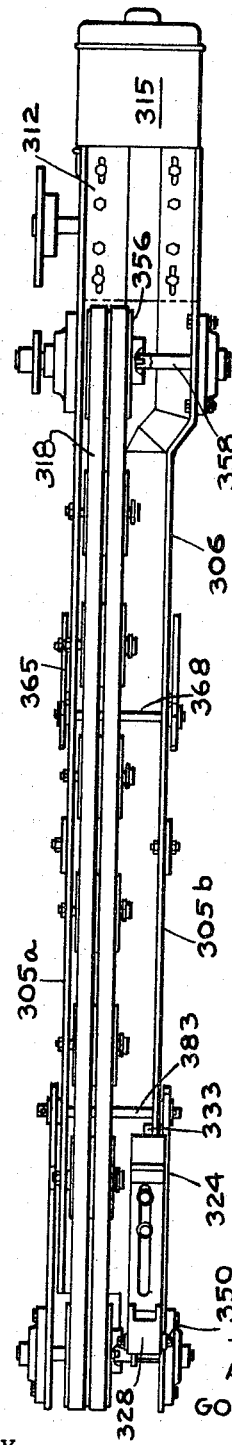

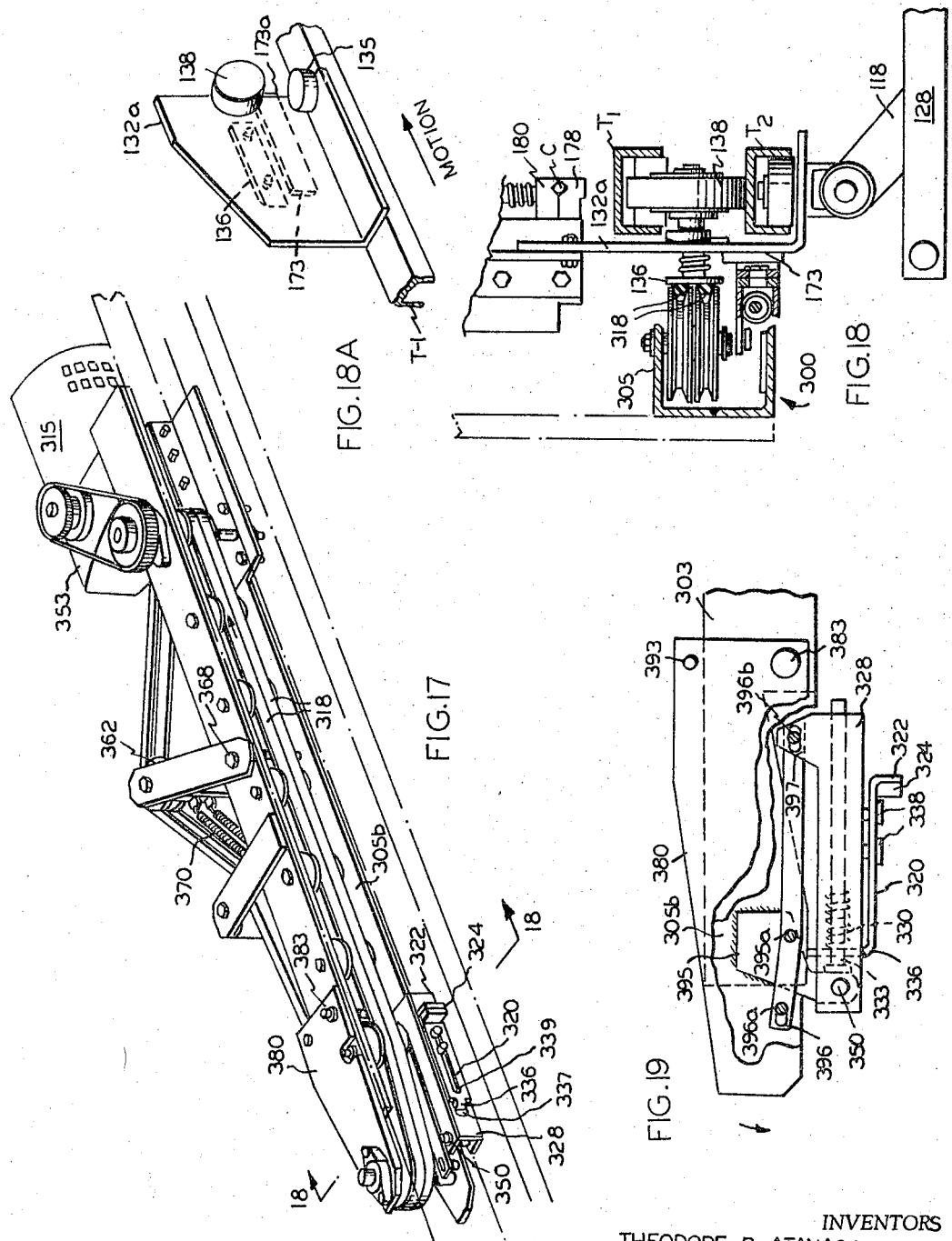

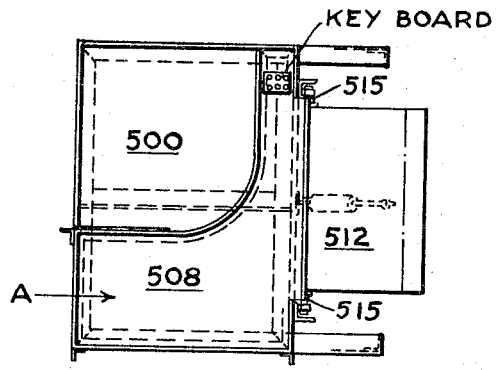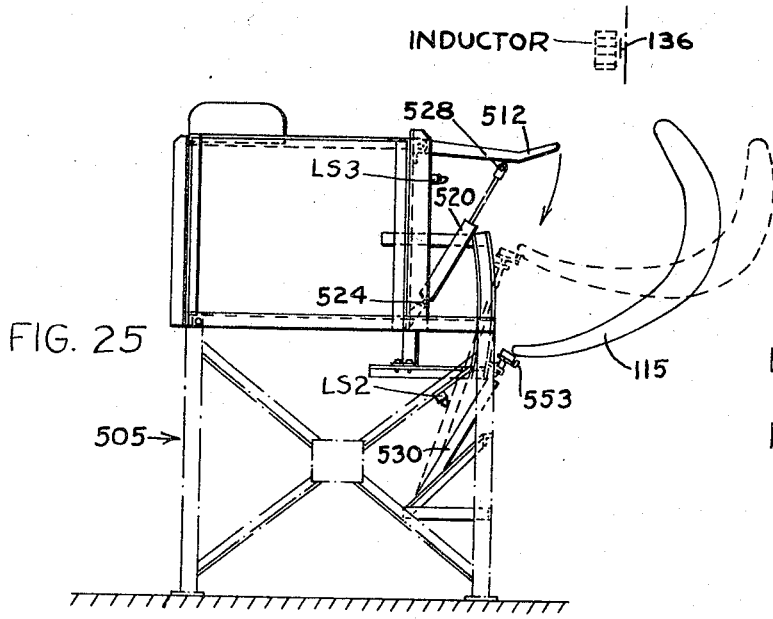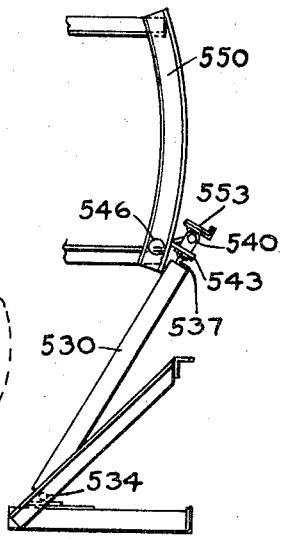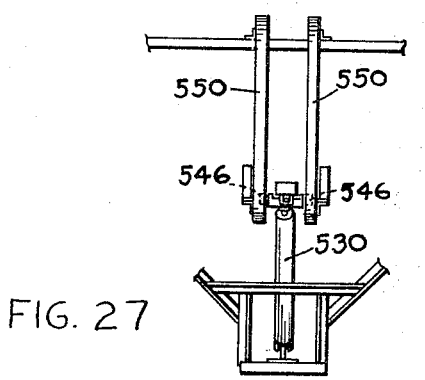

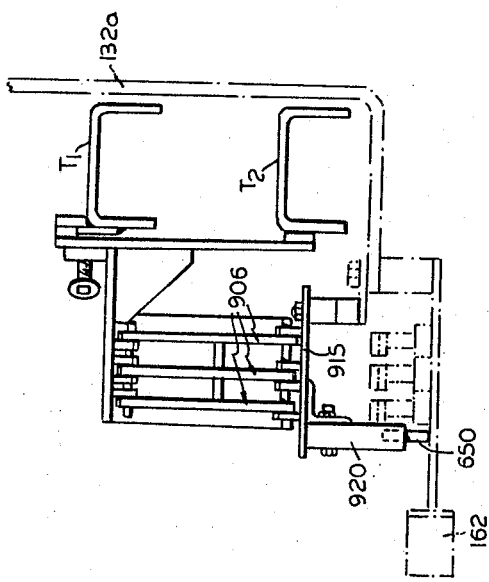
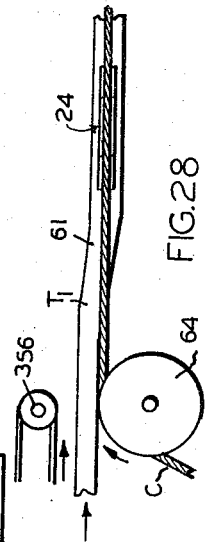
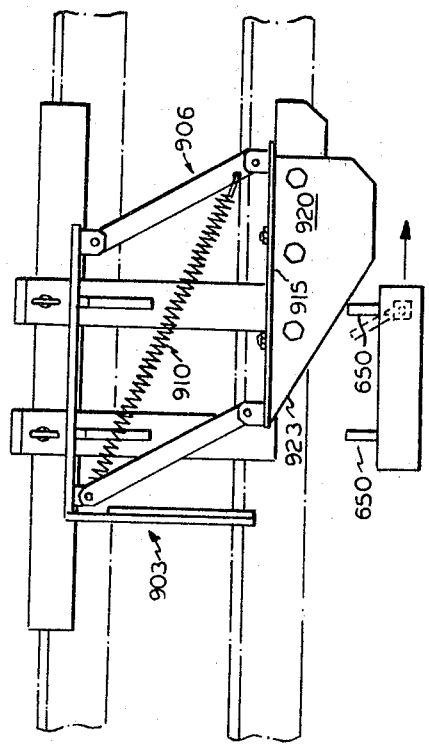
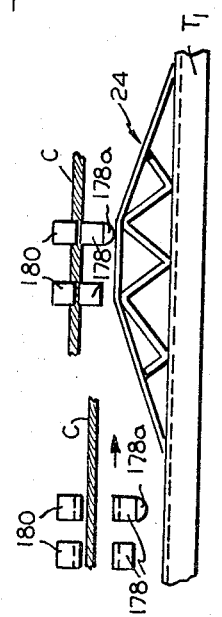
INVENTORS
THEODORE B. ATANASOFF
GORDON L. MORGRET
BY Albert M. Zalkind
ATTORNEY April 4, 1967 T. B. ATANASOFF ET AL 3,312,358
OVERHEAD TROLLEY SYSTEM FOR POSTAL SORTING APPARATUS
Filed Jan. 28, 1964 13 Sheets-Sheet 10
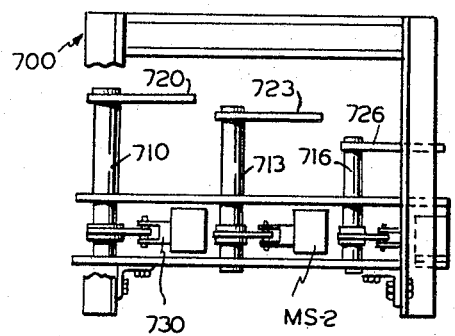
FIG.30
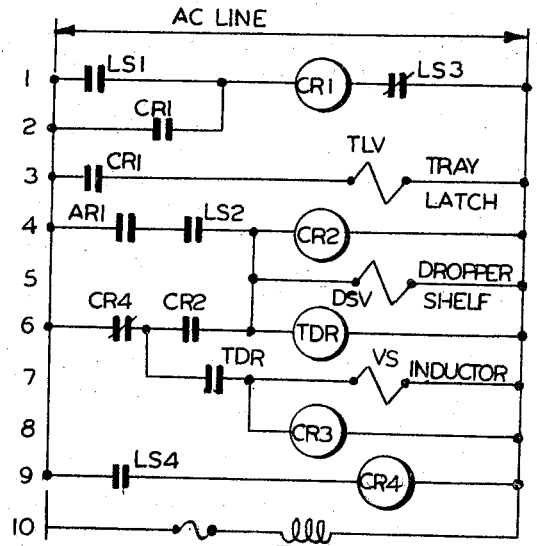
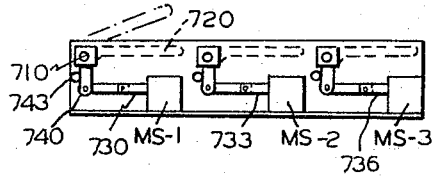
FIG.31
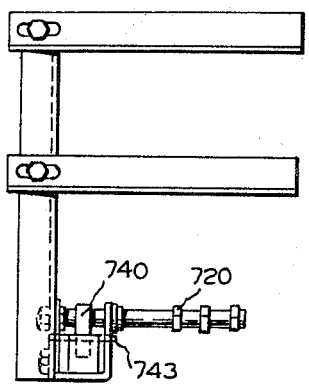
FIG.32
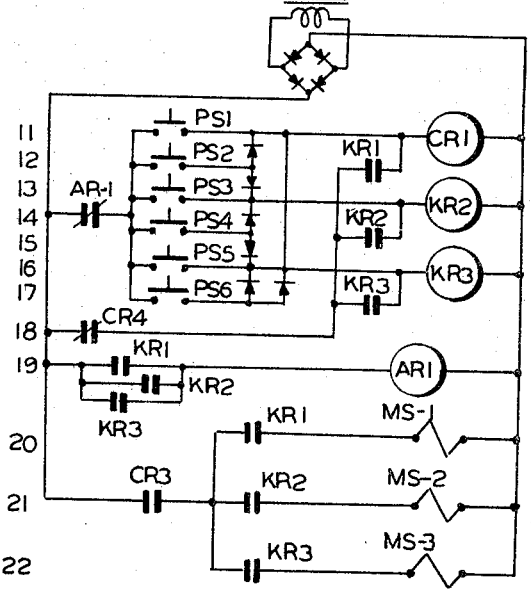
FIG.33
INVENTORS
THEODORE B. ATANASOFF
GORDON L. MORGRET
BY Albert M. Galkind
ATTORNEY April 4, 1967   T. B. ATANASOFF ET AL   3,312,358
OVERHEAD TROLLEY SYSTEM FOR POSTAL SORTING APPARATUS
Filed Jan. 28, 1964   13 Sheets-Sheet 11
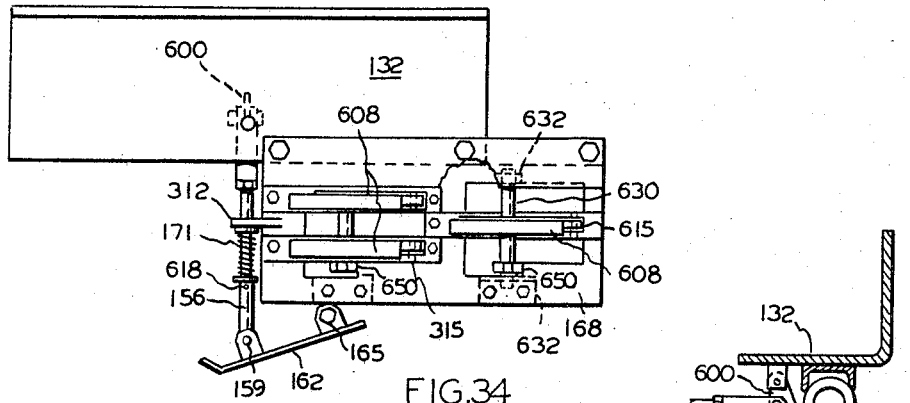
FIG.34
FIG.38
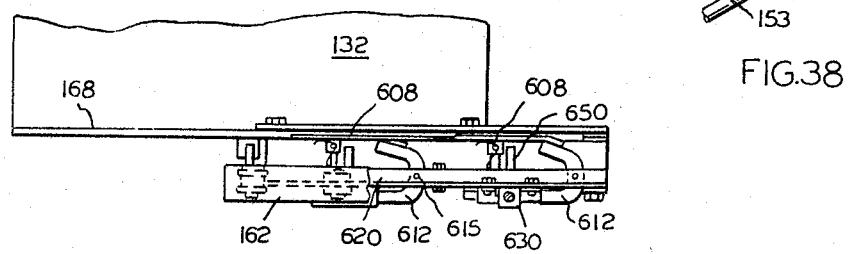
FIG.35
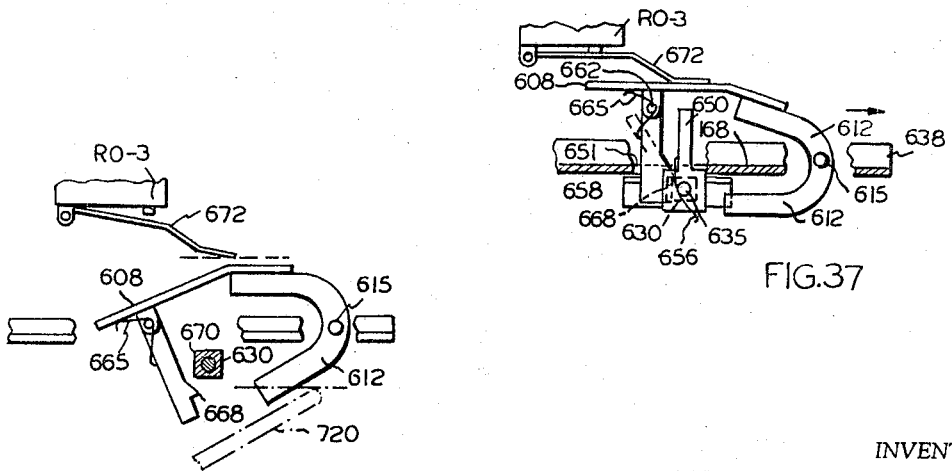
FIG 36
FIG.37
INVENTORS
THEODORE B. ATANASOFF
GORDON L. MORGRET
BY   *Albert M. Zalkind*
ATTORNEY April 4, 1967  T. B. ATANASOFF ET AL  3,312,358
OVERHEAD TROLLEY SYSTEM FOR POSTAL SORTING APPARATUS
Filed Jan. 28, 1964  13 Sheets-Sheet 12
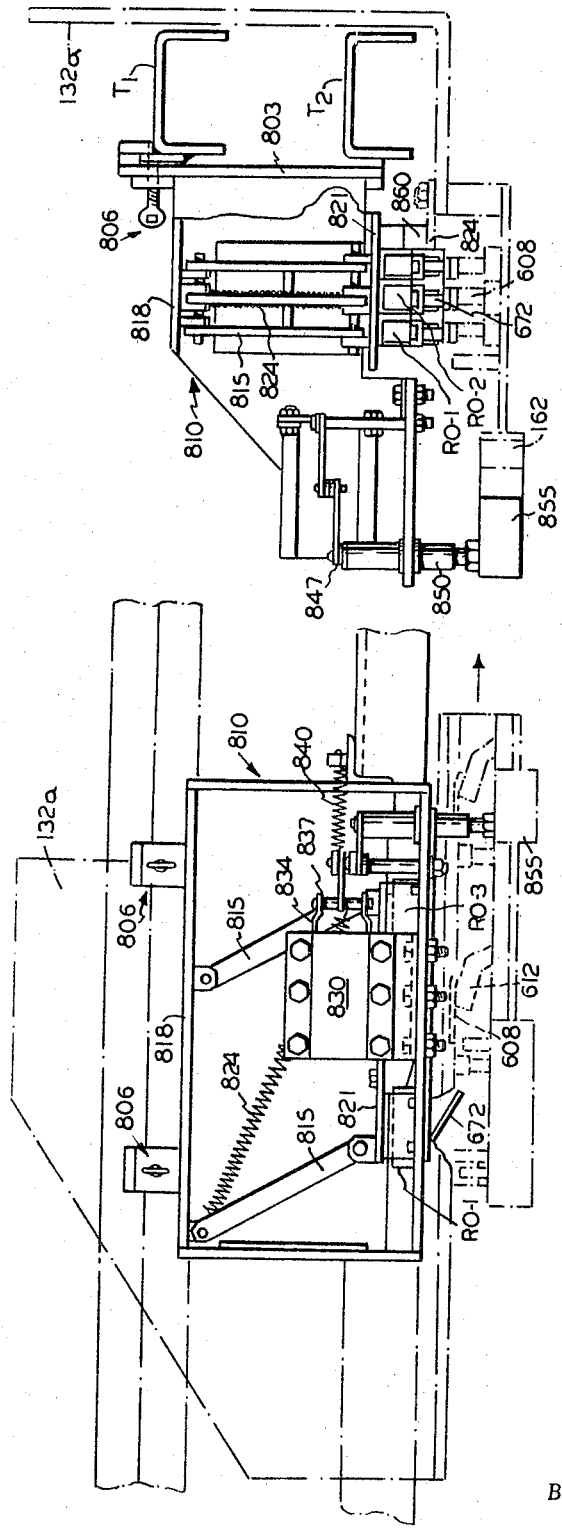
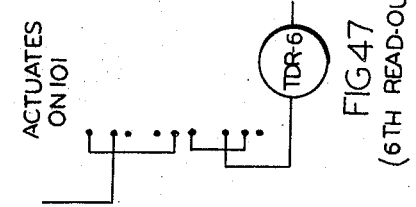
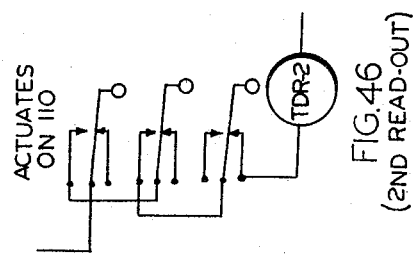
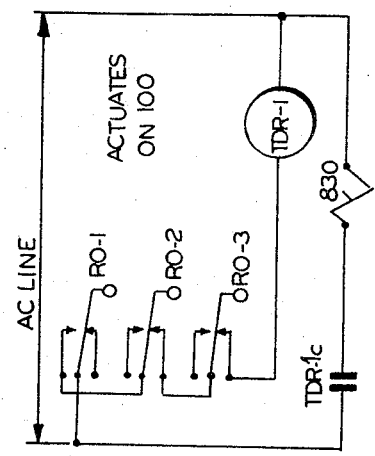
INVENTORS
THEODORE B. ATANASOFF
GORDON L. MORGRET
BY Albert M. Zalkind
ATTORNEY April 4, 1967   T. B. ATANASOFF ET AL   3,312,358
OVERHEAD TROLLEY SYSTEM FOR POSTAL SORTING APPARATUS
Filed Jan. 28, 1964   13 Sheets-Sheet 13
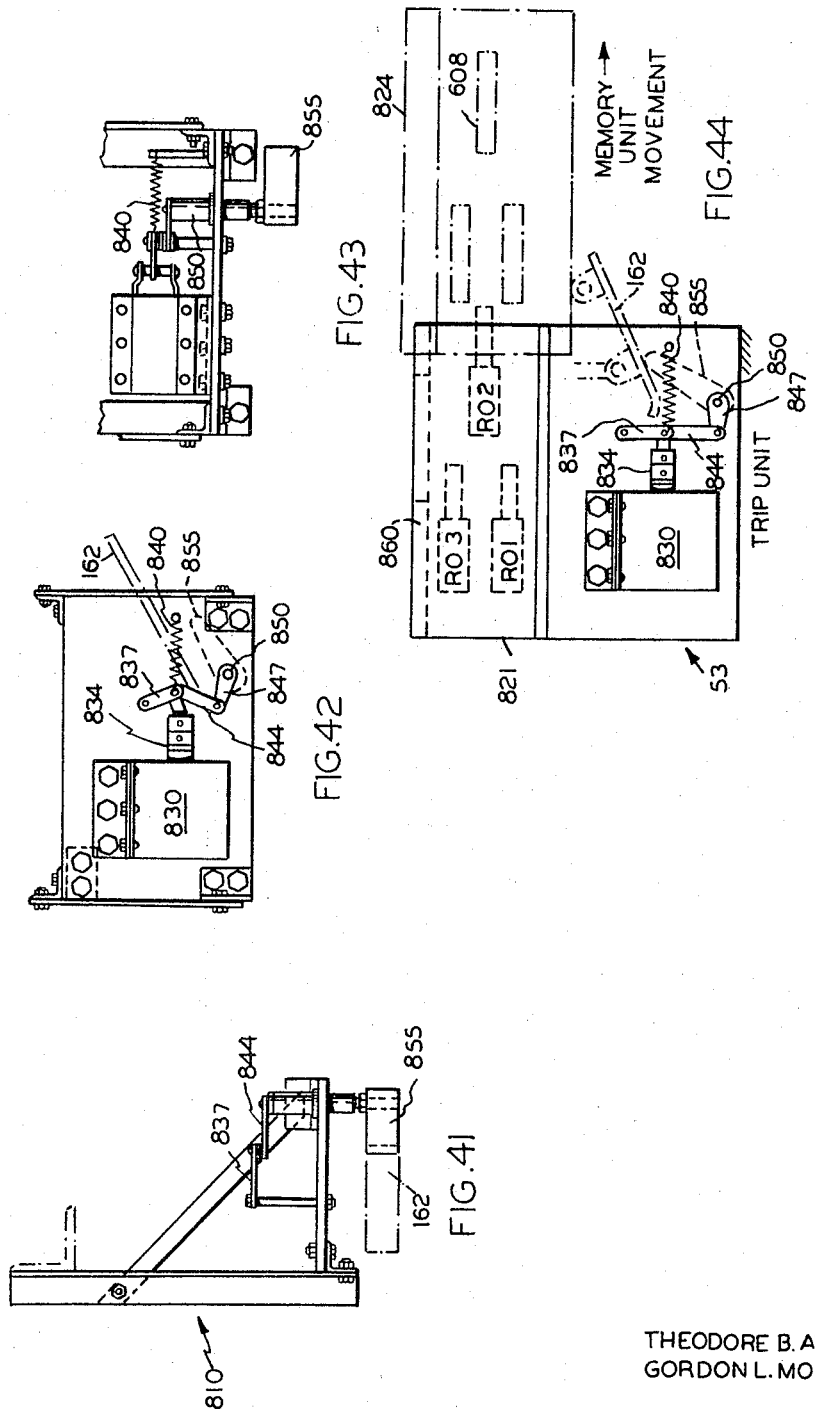
INVENTORS
THEODORE B. ATANASOFF
GORDON L. MORGRET
BY *Albert M. Zalkind*
ATTORNEY

United States Patent Office

3,312,358
Patented Apr. 4, 1967

3,312,358
OVERHEAD TROLLEY SYSTEM FOR POSTAL
SORTING APPARATUS
Theodore B. Atanasoff, Frederick, and Gordon L. Morgret, Middletown, Md., assignors to Aerojet-General Corporation, El Monte, Calif.
Filed Jan. 28, 1964, Ser. No. 340,724
14 Claims. (Cl. 214—11)

This invention relates to sorting systems for use in large postal installations, and particularly to systems which use overhead tracks and tractor cables for moving individual trays or parcel carriers.

A basic object of the invention is to provide automation in an overhead trolley conveying system wherein loads may be placed in respective trays at a loading station, each load to be discharged at a specific point in the system in accordance with operator program control.

It is another object of the invention to provide an apparatus readily installable in an existing building and particularly where structural limitations and obstacles often prevent the effective use of floor mounted conveyor belts.

It is a further object of the invention to provide a system which is economical as to manufacture of its components and also economical as to installation.

A still further object of the invention is to provide a system of great versatility in that any arrangement of overhead tracks may be installed with switching of trays from one track loop to another in a simple manner, and having one or more loading stations in each loop.

Briefly, the invention comprises an overhead track arrangement from which are suspended a plurality of individual load carrier trays which have means for clamping or unclamping to a continuously moving tractor cable associated with the track. Thus, each tray is loaded at a loading platform by an operator, while stationary, and by a novel mechanism it is set in motion to bring it to cable speed at which time the clamp grips the cable so that further movement is effected by cable pull.

Novel pulley means associated with the cable means are provided for permitting the carriers to turn corners whereby no interference occurs with the clamp mechanism of the carriers. Each carrier has a tiltable load carrying tray and means are provided for placing such trays in position to receive loads at the operator platform and for unlatching such trays at dump points so that they tilt and their loads drop out while the carriers remain in continuous motion.

The carriers thus follow a circuituous route past a series of dump points, or destination points, ultimately returning to the operator platform empty for re-loading.

A novel arrangement effects unclamping of each carrier from the tractor cable upstream of the operator platform whereby final movement of the carriers is by gravity, on a slightly sloped track, to the operator platform at which point they are stopped, loaded, and once more sent around the circuit, means being provided to set them in motion up to cable speed at which time they automatically clamp to the cable.

Any conventional memory and readout system may be utilized for programming the dumping of trays at predetermined dump points in accordance with geographical destination of parcels or sacks of mail carried by the trays. However, a unique system of units for effecting coding, memory and readout functions are described herein for the purpose of effecting load discharge control in conjunction with keyboard programming circuitry. Further the combination used for such programming is also used to effect switching of carriers between adjoining tracks.

A detailed description of the invention now follows in conjunction with the appended drawing, in which:

FIG. 1 is a plan view diagrammatically illustrating a track system utilizing the features of the invention;

FIG. 2 is a perspective fragmentary view, illustrating a track switch;

FIG. 3 is an elevation showing details of the track switch power cylinder;

FIG. 4 is a fragmentary elevation partially in section showing details of the pivotal mount for a switch tongue;

FIG. 5 is a perspective showing the cable drive for the system;

FIG. 6 is a plan view showing the arrangement of a fixed finger for tripping a carrier cable clamp in order to release its grip on the cable;

FIG. 7 is a plan view showing the arrangement of a solenoid operated finger for tripping a carrier cable clamp;

FIG. 8 is a perspective view showing the rear of a carrier mounted on a section of the track system;

FIG. 9 is an elevation to a somewhat smaller scale showing details of a carrier;

FIG. 10 is an elevation to a larger scale showing details of the carrier cable clamping mechanism;

FIG. 11 is a plan view diagrammatically illustrating a track switch junction;

FIG. 12 is a schematic diagram showing control circuitry whereby a carrier on one track is stopped from movement so that it cannot collide with another carrier approaching the same track switch junction, on another track.

FIG. 13 is an elevation showing the braking mechanism for stopping a carrier;

FIG. 14 is a plan view of the braking mechanism;

FIG. 15 is a plan view of an inductor device which starts the carrier motion from a standstill position;

FIG. 16 is an elevation of the inductor device;

FIG. 17 is a perspective of the inductor device;

FIG. 18 is a section through 18—18 of FIG. 17;

FIG. 18a is a perspective of a carrier element;

FIG. 19 is a fragmentary plan view with certain portions broken away of the mechanism of the inductor device which effects stopping of a carrier for loading;

FIG. 24 is a plan view of a loading station operator platform;

FIG. 25 is an elevation;

FIG. 26 is a fragmentary elevation showing details of the pneumatic cylinder which raises carrier trays at the operator platform;

FIG. 27 is a fragmentary elevation oriented 90° from FIG. 26;

FIG. 28 is a plan view showing the arrangement of a cable clamping cam as associated with the inductor station, the same cam being understood to be utilized at various track switching junctions in any given system;

FIG. 29 is an elevation showing the clamping cam and its action in conjunction with the cable clamp grip jaws of a carrier;

FIG. 30 shows a coding or a write-in unit in fragmentary plan;

FIG. 31 shows an elevation of such unit;

FIG. 32 shows an elevation taken at 90° from FIG. 31 to illustrate mechanical details of the unit;

FIG. 33 is a schematic electrical diagram showing the control circuitry of the coding unit and operator keyboard;

FIG. 34 is a plan view showing a memory unit and certain mechanical elements of the tray release finger;

FIG. 35 is an elevation showing portions of the memory unit;

FIG. 36 is a fragmentary elevation showing a code finger in uncoded position;

FIG. 37 is a fragmentary elevation showing a code finger in coded position;

FIG. 38 is a fragmentary elevation showing mechanical details of the tray release finger actuation;

FIG. 39 is an elevation showing a readout unit located at the dump station;

FIG. 40 is an elevation of the unit taken at 90° to FIG. 39;

FIG. 41 is an elevation showing relative positions of the readout trip finger and a tray release finger for effecting engagement;

FIG. 42 is a plan view showing the readout trip finger position when the readout solenoid is not energized;

FIG. 43 is an elevation of FIG. 42;

FIG. 44 is a plan view showing the memory unit and readout unit relationship for load dumping;

FIG. 45 is a schematic electrical diagram of the microswitch arrangement of the readout unit for one dump station;

FIG. 46 shows the microswitch wiring for a second dump station;

FIG. 47 shows the microswitch wiring for still another dump station or for control of a cable clamp release mechanism and/or control of a switch function to effect switching of a carrier;

FIG. 48 shows an elevation of a code finger reset unit;

FIG. 49 shows an elevation of the unit taken at 90° from FIG. 48; and

FIG. 50 is a block diagram of the pneumatic system of the invention.

*The cable, track and switching system*

Figure 20:
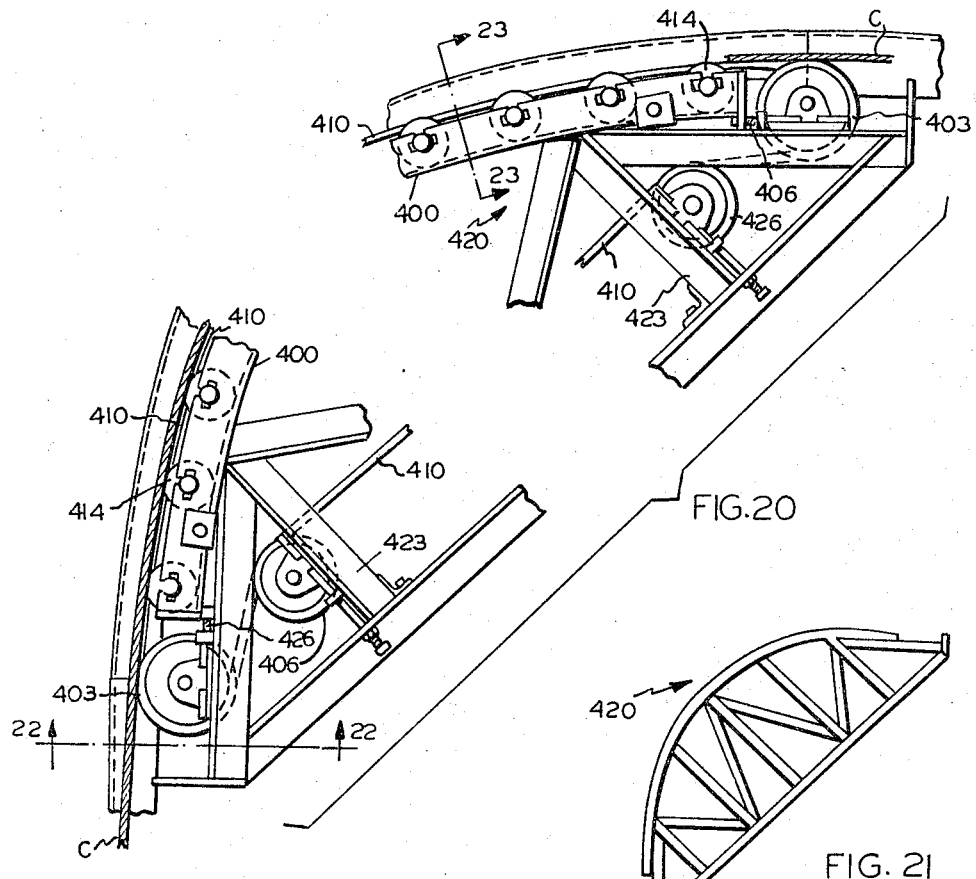
FIG. 20 is a fragmentary plan view of a track turn structure around which the tow cable of the system is guided.
Figure 21:
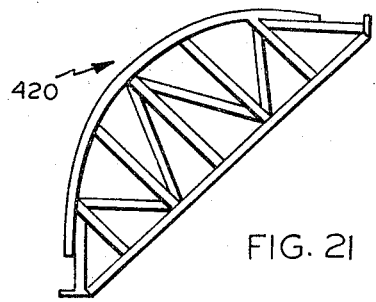
FIG. 21 is an overall plan view of the turn structure.
Figure 22:
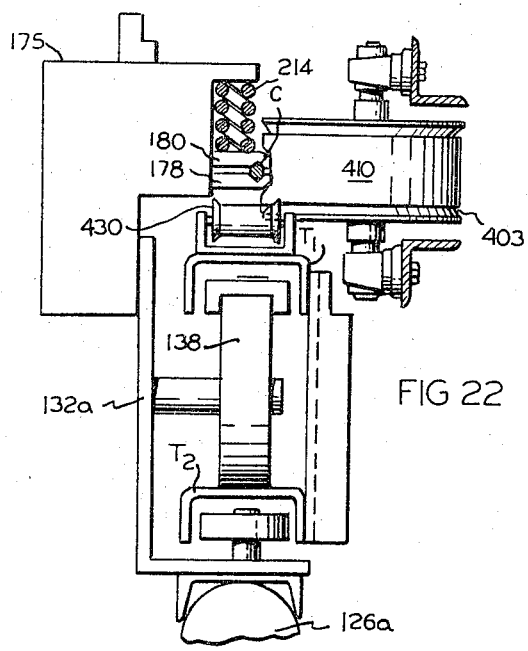
FIG. 22 is a section through 22—22 of FIG. 20 and added thereto certain carrier components.

FIG. 1 shows a schematic plan view of one type of overall system utilizing the several components of the invention. All components will be described in detail subsequently. However, for purposes of gaining an understanding of the general operation, FIG. 1 shows a Track A component which is connectable by track switches 10 and 12 to a supplemental Track B component. It will be understood that the tracks dependingly support for movement a series of individual package or load carriers each mounted on rollers (see FIGS. 8–10) and routed around the tracks, being pulled by cables, $C_1$ and $C_2$, there being a respective cable for each track component, as shown, and each carrier having a clamp mechanism which can clamp or unclamp from the cables, and also each having a memory device (see FIGS. 34–38) programmed at the time it is loaded by an operator.

Each cable is a continuous stranded steel wire member and is driven by a respective drive mechanism 15. Considering Track A, a carrier starts at a loading platform P (see FIGS. 24–27) and it will be noted that the cable $C_1$ is associated only with a certain portion of the Track A, this being true likewise for cable $C_2$ of Track B. The portions of the tracks over which the cables do not run have a slight downgrade (about 3°) so that the carriers can coast on the tracks in the direction of the dotted arrows to predetermined points after releasing their grip on the respective cables before entering the coasting sections.

Thus, considering track switch 12 to have been shifted, as indicated by the dotted lines in FIG. 2 so that a carrier can be shunted to Track B, a solenoid operated mechanism 18 is provided which, pursuant to coding of the carrier memory to be described, unclamps such carrier from cable $C_1$ somewhat upstream of the switch, whence the carrier arrives at the switch by its own momentum and thence coasting down a slight grade provided for the track portion 21, clamping once more by operation of fixed cam mechanism 24 (FIG. 28) to the cable $C_2$ to be pulled along the main straight portion of Track B. The carrier then engages an automatic clamp release finger device 27 (FIG. 6) which disconnects it from the pull of the cable $C_2$ whence it coasts down the slightly graded track portion 30 to the switch 10 which is at this time aligned to shunt the carrier back to Track A. The carrier continues its coasting on a downgrade portion 33 of Track A ultimately reaching a carrier stowage area 36, where a device 40 resets the memory. A number of carriers are thus stowed, awaiting loading, the carrier at the loading platform P being blocked from movement by a stop finger which is part of an inductor mechanism to be described while being loaded and thus blocking succeeding carriers from movement.

Prior to the coasting section 33 a safety device such as 43 to be subsequently explained may be provided which will stop the movement of any carriers on Track A approaching the switch junction 10, in response to movement of any carrier on the section 30 of Track B in order to avoid collision of carriers, switches $S_1$ and $S_2$ being actuated by a carrier on Track B to effect operation of the safety device 43.

From the above, it will be noted that the carriers move only clockwise on the tracks and make the complete route from loading platform P to trolley stowage area 36. In so doing they pass various dump points, such as chutes 50, where loads are automatically dumped in accordance with operator programming of respective memories. The complete memory system comprises readout devices, to be described, such as 53, located at respective dump points.

Thus, a carrier coasting into the stowage area 36 would have its memory reset by the resetting device 40 and would bump the carrier ahead of it to be brought to a stop, the carriers being provided with resilient shock cushioning elements.

The carriers thus are coastably adjoining each other at the loading platform P, being backed up to the stowage area and the carrier immediately in front of the platform is loaded while being held against movement by the inductor stop finger.

After loading, each carrier is given an impetus at the platform by an inductor mechanism to be described being thus moved to a point where its clamp would be actuated by another fixed cam device such as 24 disposed at a track jog 61, to clamp the carrier to the cable $C_1$. Thereafter, the carriers follow around the circuit, dropping loads at particular chutes for which they are coded, ultimately arriving at another device 27 which automatically unclamps them from the cable $C_1$ whence they begin the coasting phase around the track section 33 back to stowage area 36.

Attention is called to the large bend in the track at the right-hand end of FIG. 1 the phantom line structure there depicting a particular component (see FIGS. 2–23) which guides the cable to follow the track for the curved portion thereof and to maintain it properly superimposed over the track when there is no carrier clamped to the cable. Such component is not necessary for other turns in the cable since they occur at jog points (61, 63) where the carrier is not clamped to the cable, the cable going around sheaves at such points, such as sheaves 64, and thus being separated from the track whence no interference with the clamp device occurs.

Referring to FIG. 2, a perspective of a track switch is illustrated along with coacting members and including a partial view of the carrier and tray, together with it supporting rollers and clamping device, all designated as such. Tracks A and B are shown, and the cable $C_1$ is depicted as a phantom line. Cable $C_2$ is not shown due to space limitations, but it will be understood from FIG. 1 that it is superimposed over Track B at the track jogs adjacent sheaves 64 (FIG. 1).

Thus, each jog is provided so that the cable may be disposed over its track in a median plane thereof with the sheaves 64 displaced transversely of the track so that the cables and sheaves will not interfere with the passage of the clamping device of the carrier.

As will be noted on FIG. 2 each track actually consists of superimposed channel members $T_1$ and $T_2$ (see FIGS. 8–10). $T_1$ being the upper track member for stability and guidance and the top surface of $T_2$ performing the actual support role, in that the two main rollers of the carrier ride on such surface. A pivotal switch section consisting of two channels of track, $T_{1S}$ and $T_{2S}$, are integrally fastened to each other as by a vertical tie bar 70, welded thereto, and one end of this integral structure is pivoted as by pins 73 to the corresponding track channels. Thus, as shown in FIG. 4. plates 76 and 79 are fastened to channels $T_1$ and $T_2$, plate 76 being above channel $T_{1S}$ and plate 79 being within channel $T_{2S}$, and being pivoted thereto by pins 73.

From the above construction, it will be apparent that the switch member can be swung reversibly between Tracks A and B, as indicated by the dashed lines joining the tracks.

The power for moving the switch member is in response to memory programming of a carrier to be switched and is effected by a pneumatic cylinder 82 (FIG. 3) having a rod 84 extending through a clevis joint for pivotal connection to a channel-like housing 85 which is welded to the switch member. The cylinder itself is carried by another channel-like housing 88 secured to the channels $T_1$ and $T_2$ of Track A. The construction is such that housing 88 can nest within housing 85 when the cylinder is provided with air pressure so that the cylinder rod exerts a force on housing 85 to push the switch member about pins 73 for switching from Track A to Track B.

The drive for the cables, designated by reference character 15, is shown as to its fundamental components in FIG. 5. Thus, starting at the left end of the cable, it would be wound one or more times about sheaves 93 and 96, the sheave 93 being driven via belting 98 and the gear box 101 by a motor 103. The cable has tension applied to it by a weight 105 acting through a sheave 107, the right-hand end of the cable then extending in a direction opposite to the left-hand end. It will be noted that the cable passes into the drive 15 at one level and emerges at a lower level. This is due to the fact that the track over which the cable drive is provided is inclined upward at a small angle to provide the increase in elevation needed to obtain the 3° decline, required for coasting from the end of the cable drive section to the induction station at the operator platform P.

FIG. 6 shows an arrangement for the carrier clamp trip device 27, consisting merely of a fixed plate 110 secured in any suitable manner over either track and having a finger 112 welded to its under side. The finger is disposed to engage a trip button 238 which is part of the cable clamping mechanism to be subsequently described (FIG. 10). Thus, as the carrier moves past finger 112 the clamp which connects it to the cable is released and the carrier then coasts.

FIG. 7 (also see FIG. 6) shows a solenoid operated finger 855 for tripping button 238 so as to release the carrier cable clamp from cable $C_1$, as indicated by mechanism 18 in FIG. 1. The solenoid is controlled by a read-out unit as later described. Thus, when it is desired to switch a carrier from Track A to Track B, the memory system of that carrier is programmed by the operator for that purpose and the read-out unit is used in conjunction with the solenoid 830 (see FIG. 44) to energize it whence finger 855 is pulled into position via the toggle linkage shown in FIGS. 7, 42, 44, to be engaged by trip button 238 so that the carrier coasts through the switch 12 to be subsequently clamped to cable $C_2$ by the cam 24.

*The carrier*

Referring to FIGURES 8 through 10 and particularly FIG. 8 the carrier comprises a curved panel load carrying tray 115 pivoted between a pair of arms 118 on suitably provided trundles 120, the tray being roughly crescent-shaped, having a general horizontal load carrying portion 115a and a generally vertical back 115b. The arms 118 are part of a frame structure comprising the angle iron bar 123 and a bar 126. Stops 127a are on arms 118 and prevent the tray from being lifted too far in being moved to latched position. Stops 127b are attached to the tray and limit the dumping motion by engaging arms 118. Carried at the ends of bars 126 are spring-biased bumper members 128 and it will be understood that these bumper members provide a cushioning effect to resist shock and impact between carriers, particularly on the free part of the track just prior to a loading station. Carried on the bar 126 is an angle bracket 132 and two horizontal rollers, such as 135. The vertical flange 132a carries a resiliently mounted slide shoe 136, carried on rods 136a against spring 136b. Flange 132a also carries two large vertical rollers, such as 138 and a bracket for support of another horizontal roller 140 as shown. The large rollers ride on the lower of two tracks, $T_1$ and $T_2$, which are, respectively, upper and lower tracks, in the form of inverted channels in vertical alignment. The two small rollers 135 fit between the flanges of track $T_2$ and serve as a side thrust support means, while the upper small roller 140 performs the same function inside track channel $T_1$. Thus, it will be understood that the tray is rollably carried on the tracks, primary support being on track $T_2$, track $T_1$ being provided for stability.

The purpose of slide shoe 136 will be hereinafter explained in conjunction with the inductor mechanism, elsewhere in this specification.

Referring back to the carrier tray 115, a releasable latching means is provided for retaining such component in the position shown for supporting a load. Thus, the bar 123 carries a pair of spaced cleats 144 between which is pivoted a dog 147 abuttable with an edge mounted catch 150. The dog 147 is pivotably secured to a rod 153 which in turn is pivotally secured to a rod 156 at the joint 159. Rod 156 has pivotal connection to a tray release finger 162 pivoted at 165 to a memory support plate 168 suitably fastened to the horizontal flange of the angle plate 132. A compression spring 171 is interposed between the plate and finger. Plate 168 also serves as a support for the switch actuating code fingers F of the memory system and for code finger reset toggle levers L to be later described.

The rod 156 is articulated by a bell crank lever 600 (FIG. 38) so that movement of rod 156 will pull rod 153 to trip the pawl 150 whence the tray 115 swings to drop the load. Such movement of rod 156 is effected by the finger 162 at a selected dump station when it engages a solenoid operated dump finger 855 (FIG. 43) of the read-out unit shown in FIGS. 41–44.

A stop 173 is carried by flange 132a, which abuts a member on the inductor to be subsequently explained; this stops the coasting motion of the tray in arriving at the operator's station.

In the position shown in FIG. 8, the tray is latched. If, however, finger 162 be pressed against bias of spring 171, an effect accomplished by the read-out unit at the various dump stations in accordance with memory control, rod 156 pulls rod 153 to release the dog 147 from the catch 150 and the tray swings counter-clockwise, as viewed on FIG. 8, or clockwise, as viewed on FIG 9, of its own weight albeit also by the weight of the load, to dump at a predetermined station. Such dumping occurs while the tray is moving and, thereafter, the tray continues full circuit back to the loading station in a latch released condition. The spring 171 biases finger 162 to maintain dog 147 in tray latching condition so that if the tray is swung to latching position, the dog will automatically catch against the latch 150 to once more latch the tray and hold it ready for loading. This occurs at the loading station in a manner to be hereinafter described, save to say at this time that a pneumatic cylinder below a platform on which the operator stands effects the force necessary to rotate the tray by engaging against the tray cleat 173 as to bring it back into latched condition ready to receive another load.

As heretofore mentioned, the cable C provides the motive power for the carrier and a releasable clamp mechanism is carried by the carrier for engaging with and disengaging from the cable, as required. Such clamping mechanism is carried by the flange 132a and comprises a pair of vertical plates 175 secured thereto and to which are pivoted (see FIG. 10) lower and upper jaws comprised of pairs of bars, such as 178 and 180, the lower jaw pair being designated as bars 178, and the upper jaw pair as bars 180. One bar 178 (FIG. 8) has a component 178a to engage the cam 24 (FIG. 29). The upper pair of bars is pivoted between the plates as by a pin 183 while the lower pair is pivoted as by a pin 186. A clamp control finger 190 is pivoted between plates 175 as by a pin 193, being disposed between the bars in a vertical plane, and is notched at its lower end to provide a trigger portion 196, being biased clockwise by a leaf spring 200 carried between the plates 175 and stressed by a pin 203 likewise carried between the plates. Thus, the trigger 196 can slip past a sloping cam portion 205 on a spacer 208 between the lower clamp bars, which spacer is rigidly secured to said bars to form the lower clamping jaw. The lower bars also carry a stop cleat 211 against which the forward edge of trigger 196 abuts for limiting position. As shown in FIG. 10, the lower bars are in clamping condition against the cable C which fits into notches therein, and the cable is thus thrust into corresponding notches in the upper bars to be securely gripped between the pairs of bars.

The clamp grip on the cable is of a resilient nature and is provided by a coil spring 214 abutting at its lower end against the upper bars 180 as by a washer 217 and being guided by a concentric rod 221 abutting against the washer 225 which in turn engages a pin 228 through the rod. The rod is slotted at its lower end and a pin 232 passes through the slot as shown, which pin is supported at its ends between the upper bars 180. From the construction described, it will be apparent that any upward thrust on the lower bars 178 will cause them to impinge against the cable causing the cable to impinge against the upper bars and the upper bars will move pin 232 upwardly to cause washer 217 to compress the spring. At this time the clamp control finger 190 is swung clockwise under force of spring 200 so that the trigger 196 latches under the bars 178 and both pair of bars are then resiliently clamping the cable.

A means for effecting such clamping movement of the lower bars is provided by way of a fixed cam 24 (FIG. 29) mounted on track T₁, the upper track, and such cams are disposed at points where the trays leave loading stations after being given a predetermined degree of velocity from standstill by a mechanism to be later described.

The control finger 190 carries at its upper end a button 238 (see FIG. 6) and it will be apparent that pressure on the button will rock the finger to release the trigger 196, grip of the clamping bars on the cable then being released. This occurs when the tray is about to enter a coasting section prior to moving into the operator station for reloading. As previously explained in connection with FIG. 6, the finger 112 is engaged by button 238 as the carrier leaves the cable driven section to release the carrier from cable drive by tripping the cable clamp.

*Carrier stop safety device for track switch*

FIG. 11 through FIG. 14 show a safety device which prevents carriers from colliding with each other in the event of switching from one track to another. Thus, FIG. 11 shows diagrammatically the merging of tracks A and B and the track Switch T₁ₛ (see FIGS. 1 and 2). Disposed along side track A is the solenoid operated stopping mechanism 43 which will be explained hereinbelow, and disposed spacedly along track B are a pair of microswitches S1 and S2 which control the safety circuitry of FIG. 12 in order to energize a carrier braking device as shown in FIGS. 13 and 4 which prevents carriers from colliding at the switch junction. It will be understood that the carriers are approaching the switch junction from the directions of the arrows shown in FIG. 11.

Referring to FIG. 12, when a carrier actuated switch S1 on track B, the relay R1 is energized and seals in via contact R₁, line 2, and normally closed contact R₂, line two. This actuates the solenoid valve Sol. V. 1 through contact R₁, line 3. Energization of such valve (valve per se not shown) effects air pressure in the cylinder 245 (FIGS. 13 and 14) which effects thrust via rod 248 and a clevis connection, as shown, to a pivotal brake shoe 253, having suitable frictional material surfacing. The brake shoe then swings outwardly in the direction shown by the arrow in FIG. 14, to engage the slide shoe 136 which is on the plate 132A of the carrier (see FIG. 8 and FIG. 18 ), this being the shoe which is engaged by the inductor to start the carrier moving at the operator platform. The shoe 136 is, of course, moving with the carrier in the direction of the straight arrow shown in FIG. 11. Thus, the carrier on the coasting portion 33 (FIGS. 1 and 11) will be stopped and a carrier on track B which has just actuated switch S1 will continue to move on its coasting portion 30 until it actuates switch S2.

The switches S1 and S2 are spaced far enough apart so that if a carrier has just passed the stop unit 43 on track A at the time a carrier actuates switch S1, the carrier on track A will continue to travel through the track switch before the carrier on track B arrives at switch S2.

When the carrier on track B actuates switch S2, the time delay TDR 1, which is of an instant make delayed break type is energized by closure of S2 which opens normally closed contact R₂, line 2, to break the seal current of relay R1, thus deenergizing that relay. However, although contact R1, line 3, then opens, the valve solenoid Sol. V. 1. remains energized via contact R₂, line 4, and the contact R₂, line 7, energizes the valve Sol. V. 2 (valve per se not shown) for the switch actuating cylinder 82 (FIG. 2) to move the switch member (T₁ₛ–T₂ₛ) from track A to track B. The delay effect of relay TDR–1 is sufficient to permit the carrier on track B to coast through the switch junction after which relay TDR–1 is deenergized to deenergize relay R2, line 7. The deenergization of relay R2 opens the valves which control air to the cylinders 82 and 245 whence the brake 253 is moved back to a nonengaging position and the track switch likewise moves back into alignment with track A.

It will be understood that the cylinders 82 and 245 are of the double-acting type so as to be retracted by air pressure, the valves being of conventional multi-way type.

*The inductor*

Referring to FIGS. 15–19 a mechanism is shown which is disposed adjacent to the loading platform (see FIG. 25) for the purpose of imparting movement to stationary carriers after loading. Thus, the stop 173 on the carrier plate 132a (see FIG. 18a) coacts with the mechanism to be described whereby each carrier is in turn brought to a halt as it coasts to the operator platform preparatory to loading. Subsequent to loading, and under operator control, the carrier is brought up to speed of the tractor cable C (FIG. 8), and then clamped thereto automatically.

The mechanism for starting the carrier motion after loading, called the "inductor" is indicated generally by the reference character 300 and comprises an elongated channel 305 having upper and lower flanges 305a and b, respectively, and having angle brackets, such as 312, at one end supporting a motor 315. The channel 305 will be understood to be suitably suspended by overhead hangers, as indicated in phantom, FIG. 18 from the building or enclosure in which the machine is installed and at a level such that belts 318, continuously moving in a horizontal plane, can engage the resiliently supported slide shoe 136 (FIG. 18a) of the carrier and frictionally drive it along the tracks. The slide shoe is carried on rods and is spring biased, as previously mentioned, which rods have slidable support in flange 132a (FIG. 18.) The belts are not engageable with the slide shoe until actuated thereagainst under operator control and at that time they have resilient engagement therewith by virtue of the resilient mount.

Accordingly, the two belts 318, when frictionally engaged with the slide shoe, will cause a carrier to be brought up to the belt speed, such speed being normally slightly higher than the cable speed; as the carrier clears the inductor, the cable clamp jaws (FIGS. 10, 28) are actuated to grip the cable C and the carrier is then pulled thereby.

The mechanism for halting the carriers at the inductor comprises a horizontally slidable bracket 320 having an extending finger 322 with a cushion pad 324 on the upstream side thereof. The bracket is mounted in a housing 328 so as to be slidable when the edge 173a of stop 173 (FIG. 18a) of a carrier strikes it, such sliding being against a compression spring 330 within the housing. Thus, the spring is concentric with a rod 333 extending longitudinally of the housing through a bore in inturned finger 336, the bracket 320 having the inturned finger 336 protruding within a slot 337 in the housing to engage the compression spring 330, and being guided and restrained by the two shoulder bolts 338 (FIG. 19) which are affixed to housing 328 through the slot 339.

The housing 328 is of channel-like construction, as shown in FIG. 17 and is pivoted to the frame 303 as by a pin 350. The arrangement is such that the housing can swing to bring the finger 322 out of the way of stop 173 of the carrier which has previously abutted it, when it is desired to move the carrier.

As has heretofore been mentioned, the motor 315 drives the belts 318 continually and this takes place through a suitable sprocket and chain arrangement 353 effecting drive of an end pulley 356 carried on a vertical axle 358 within the frame, as will be made clear from FIG. 16. The belt passes around a tensioning pulley 362 carried between a pair of swingable arms 365 suitably pivoted to the frame as by an axle 368 and being tensioned by springs 370 to the frame. Subsequently, the belts pass through a guide pulley 373 carried between suitable arms, as shown, and thence to an idler end pulley 375, passing therefrom into engagement with a series of idler support pulleys, such as 378, to return to pulley 356. The idler end pulley 375 is carried between the arms of a yoke 380 pivoted to the frame on a pin 383. Thus, from consideration of FIG. 15 it will be appreciated that the end portion of the belt between the pulleys 375 and 378a forms an angle A with the remainder of the belt, such angle A being designated by the phantom lines and, accordingly, since the location of the stop finger 320 determines the location of the slide shoe 136 of the carrier, it will be apparent that the belts cannot engage the slide shoe when the yoke 380 is in the position shown. However, when it is desired to move the carrier, the latch housing 328 is withdrawn by being rocked on its pivot pin 350 toward the frame so that the finger 322 escapes the carrier stop 173 (FIG. 18a) thus releasing the carrier. At the same time, the yoke 380 swings to align the end portion of the belt with the remainder of the belt to bring it into engagement with the slide shoe 136; the carrier is then motivated. The release and initial starting of the carrier is under operator control for loading, as has been mentioned, suitable control means tied in with the programming system being provided.

The means for effecting actuation of the yoke 380 comprises a fluid pressure cylinder 382 having a piston rod 386, an end of the cylinder being pivoted at 390 to the channel 305 and the end of the piston rod being pivoted at 393 to the yoke 380. With the piston retracted in the position shown in FIG. 15, the belt section between pulleys 375 and 378a cannot engage the slide shoe, but upon pressure being fed to the cylinder, the yoke 380 swings counter-clockwise and the misaligned belt portion moves therewith to engage the slide shoe, the belts moving in the direction of the arrow B. Simultaneously, the finger 322 swings counter-clockwise to release the carrier stop 173 and the belts now drive the carrier via shoe 136. The tensioning device 365 and springs 370 maintain the belt tension at all times, regardless of the position of the yoke 380.

Referring specifically to FIG. 19 the particular mechanism for effecting withdrawal of the stop finger 322 will now be described.

As has heretofore been stated, the stop finger is carried by a horizontal slidable bracket 320 which acts against the spring 330 to cushion the shock of stopping a carrier when the edge 173a of the carrier stop plate strikes the finger. Inasmuch as the bracket 320 is carried by housing 328 and, as has been previously mentioned, swinging of the housing about the fixed pin 350 in a counter-clockwise direction will withdraw finger 322 out of the carrier stopping position, i.e., away from edge 173a. The pin 350 on which housing 328 pivots is carried on a fixed plate 395 welded to the lower flange 305b of the channel 305 which forms the main body of the inductor mechanism. The plate 395 has secured to it a fixed pin 395a on which is rockably pivoted an actuator bar 396. The actuator bar has a slot at one end through which a pin 396a passes and which pin will be understood to be fixed to the lower flange of the pivotal yoke 380. The other end of the actuator bar is provided with pin 396b affixed thereto which extends through a slot provided in a projection 397 of the upper plate of housing 328. In operation, when yoke 380 is rotated counter-clockwise by the pneumatic cylinder 382 (FIG. 15), it causes the actuator bar 396 to rock around pin 395a counter-clockwise by virtue of force exerted by pin 396a. Acccordingly, pin 396a acting in the slot of housing 328 rocks the housing about pin 350 counter-clockwise and, thus, pulls finger 322 inwardly toward the yoke 380 to release the plate 173 whence the carrier is released for movement as then initiated by the belts 318 which engage shoe 136 upon the swinging of yoke 380.

*The cable turn component*

Referring to FIGS. 20-23, an arrangement is shown to provide for guiding the carriers around turns of any desired degree, the particular illustration being for a 90-degree turn. Thus, referring to the plan view of FIG. 20, an arcuate girder structure having parallel circular angle irons 400 carry therebetween freely rotative end pulleys 403 which are adjustable, as by the screw arrangement 406, and around which a continuous rubber-like guide belt 410 passes, being supported for free motion around the arcuate frame by rollers, such as idler rollers 414. The arcuate members form the perimeter of a truss structure (FIG. 21) generally designated as 420, wherein the end beams 423 carry pulleys 426 to support the rear flight of the belt.

Figure 23:
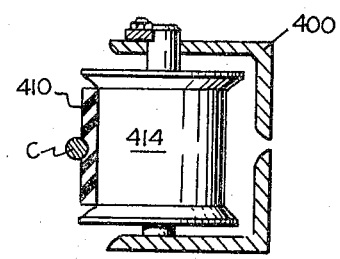
FIG. 23 is a section through 23—23 of FIG. 20.

The belt is freely movable around the pulley system described and is coated with a tough rubber-like material having a roughened or corrugated surface to provide resilience and compliance. The cable C will form a groove in the compliant surface of the belt, as shown in FIG. 23, and thus be guided around the turn. The clamp jaw bars 178 and 180 of the carrier can press into the belt material without injury or damage to themselves or to the belt, and the belt is driven by impingement of the moving cable against it.

It will be appreciated that any arcuate shape may be devised in accordance with the principles involved and that, in fact, such shape need not be circular.

It will be apparent that the belt 410 is continuously motivated by the moving cable C around its outer periphery and a spool roller 430 is disposed upstream of the belt on track $T_1$ to support and guide the cable to approximately the belt center when no carrier is clamped to the cable. When a carrier approaches the belt, it supports the cable above roller 430, the condition shown in FIG. 22.

The induction station loading platform

FIG. 24 shows a plan view of an elevated platform having a floor 500 on which an operator stands and which is supported by suitable structure shown generally as 505 above the floor at such level that an operator may conveniently move parcels and mail sacks from a shelf 508, which extends at his side and in front of him at about waist level. The sacks approach the shelf from the direction of the arrow A and may be transported thereto by a conveyor belt (not shown). It will be understood that a suitable programming keyboard can be situated anywhere on the shelf for the use of the operator in programming the dropping of loads from the trays at various destination points. FIG. 25 shows diagrammatically, a tray and the inductor.

As an aid to the operator, a loading plate 512 is hinged to the shelf at the points 515, which tray is actuated by an air cylinder 520 pivotally secured at 524 to the structure and having a piston rod pivotally secured at 528 to the loading plate. Accordingly, the plate 512 may be raised to receive a load and lowered to permit the load to slide into the tray. Thus, the operator may be completely spared the effort necessary for lifting heavy bundles and sacks, as they can be slid from the receiving point on the shelf 508 onto the plate 512 and thence dropped by air cylinder actuation into the tray. The operator must, of course, push the load onto the plate 512 sliding it on shelf 508 in doing so.

When a carrier has reached the operator's station, it is in discharged condition, that is, the tray is hanging downwardly as indicated generally by the full line in FIG. 25, and must be lifted to the dashed line position and latched to receive a load.

This is accomplished by an air cylinder 530, disposed below cylinder 520, the lower end of which is pivoted to the platform structure at 534, and from the upper end of which reciprocates a piston rod 537 having a clevis 540 secured to a plate 543 of bracket-shape which carries side rollers 546 guidedly riding in respective curved channels 550 fastened to the support frame of the loading platform. The upper end of the clevis has an angle member 553 disposed, which the rod 537 moves out of the cylinder, to engage a centrally located lip reinforcing plate of the tray. The arcuateness of the channels 550 is arbitrarily selected so that the trays will always be held in the same position when receiving a load.

The cylinder thus lifts each tray to the point where the latch dog 150 (FIG. 8) engages to lock the tray in load receiving position and steadies the tray while receiving a load.

Automatic cable clamping for carrier

As has heretofore been stated, when a carrier is at the inductor station being loaded, it is stationary and its clamping mechanism (FIG. 10) is not gripping the cable. However, once it has been started, it is necessary to effect actuation of the gripping jaws in order to grip the cable so that it will be pulled around the track system. This is accomplished in a simple manner, as shown in FIGS. 28 and 29. Thus, referring to FIG. 28, the track $T_1$ is shown along with the jog 61 as it appears generally just down stream of the operator platform, P. The inductor mechanism is indicated by the last pulley 356 thereof and the cable is seen as passing around the sheave 64 and extending down the track $T_1$.

Carried on the track is the cam element 24 which will be seen to be a ramp structure disposed to be engaged by a cam end 178a of the down stream jaw 178 which are integral with each other. This deflects jaws 178 to effect the clamping of the jaw pairs 178 and 180 on the cable as will be apparent from FIG. 29.

In a practical system, the upstream end of the cam 24 may be approximately 20 inches from the beginning of the jog 61 and cam edge 24a which engages cam end 178a, may be approximately 8 inches long with a rise of about 4 inches. Thus, a fairly high rise is provided which, however, is compensated for by the spring action of the carrier clamp mechanism, as heretofore explained, such high rise fully insuring the clamping actutation of the mechanism.

The programming and dump control system

The memory system for the parcel and sack distribution involves four components as follows:

(1) A memory for each carrier.
(2) A write-in unit at the operator load station, or at each operator loading station, if there be more than one.
(3) A read-out unit at each dump point.
(4) A memory reset unit disposed prior to the operator loading station, or one such unit prior to each loading station, if there be more than one loading station.

The coding system is of the binary type and fairly simple in nature. Thus, the memory for each carrier is a mechanical device having a series of fingers which are placed in coded position by the write-in unit which comprises solenoid operated actuators which push a selected combination of fingers into a raised position responsive to keyboard operation by the loading operator. Any carrier memory is thus codedly set in operative condition for a respective dump point, the fingers being held in raised position by a mechanical latch which is part of the memory mechanism. Each dump point has a series of microswitches disposed in a manner corresponding to the finger layout of the carrier memories; when a memory has fingers raised such that a combination of microswitches at a particular dump point are pressed, the tray is tilted at that dump point to discharge the load. The tray then remains tilted and continues completely around the track circuit, ultimately moving past the memory reset device disposed in the carrier stowage area.

The memory setting unit

The memory setting and write-in unit is of simple construction, as shown in FIGS. 30–32. The plan view of FIG. 30 shows generally a framework 700 which supports the moving elements of the unit, such moving elements comprising rotative rods 710, 713 and 716, each of which carries a coding finger, respectively, 720, 723, 726 keyed thereto. The rods have limited rotation to the extent provided by the amount of pull-in of the respective solenoid plungers 730, 733 and 736 of solenoids MS–1, MS–2, and MS–3, which will be understood to be pivotally connected to respective levers, such as 740, keyed to respective rods 710, etc. The levers normally engage respective stops, such as 743, to maintain a level position of the coding fingers when the respective solenoids are deenergized. It will be understood that suitable springs (not shown) maintain the level position of the coding fingers until respective solenoids are energized. Such energization will raise one or more of the coding fingers to the phantom line position (FIG. 31) shown, such raised position being maintained as long as the respective solenoid is energized. Energization continues until the carrier passes the memory setting device, at which time the solenoids are deenergized by the deenergization of the keying relays when the microswitch LS–4 of FIG. 33 is actuated by the moving carrier to be explained in conjunction with FIG. 33. Thus, as the carrier moves past the memory setting unit, such coding levers 720, 723 and 726 as have been raised engage the respective lower arms 634 of the memory code finger yokes 612 to be later explained in conjunction with FIGS. 34–37, to raise the code fingers 608 in position for engaging respective microswitches RO–1, RO–2 and RO–3 of the read-out units to be explained in conjunction with FIGS. 39–44, at the several dump stations.

*Control circuitry*

FIGURE 33 illustrates a basic operator coding arrangement and binary code system for programming carriers to dump respective loads at selected dump stations.

The circuitry comprises push buttons PS1–PS6 which will be understood to be mounted in the keyboard at the operator platform. Thus, for the system described herein, wherein three memory fingers are used to actuate a combination of selected read-out switches at each dump station, there would be a possibility of six dump stations around the track, this being the maximum number of read-out switch combinations for a three-switch arrangement at each station.

The circuitry elements will be described in conjunction with the operation of the circuit and the schematic diagram will be explained in conjunction with the consecutively numbered lines 1 through 22, indicating the locations of the connecting leads and components for convenient reference.

When a carrier enters the loading position at the operator platform it contacts a stationary microswitch LS1 (line 1) in so doing. Also see FIG. 1. Closing of LS1 effects energization of relay CR1 across the AC lines, the relay sealing in through its contact CR1 (line 2).

Another contact CR1 (line 3) closes to energize the tray latching solenoid operated valve TLV (valve not shown) which causes the tray latching air cylinder 530 (FIG. 26) to extend and latch the particular tray. As the piston of the cylinder reaches its fully extended position, it closes a switch LS2 (line 4). Also see FIG. 25. At this time the operator may or may not have programmed the buttons of the keyboard to select the dump station at which this carrier will unload. If the operator has not effected programming, contact AR1 (line 4) will be open and no further action of the circuitry takes place, this contact being controlled by the solenoid AR1 (line 19), which is energized only in response to the closing of one or more of the push button switches. Thus, assuming some combination of push buttons be pressed, the keying relays KR1, KR2 and KR3 are energized in accordance with the combination of buttons pressed. Energization of any keying relay, or relays, effects sealing of same through respective contacts KR1, KR2 and KR3 (lines 12, 15 and 17, respectively) and effects closure of the respective contacts KR1, KR2, KR3 (line 19). This serves to energize solenoid AR1, opening normally closed contact AR1 (line 14) whence no further energization of the keying relays is possible and contact AR1 (line 4) is closed whereby solenoid CR2 (line 4) is energized to close contact CR2 (line 6) which acts as a seal for this relay. The closing of AR1 and LS2 (line 4) also energizes a valve solenoid DSV so that the shelf 512 (FIG. 25) on which the load rests at the operator platform is dropped via retraction of the pneumatic cylinder 520 to deposit the load in the waiting tray of the carrier. At this time power is also supplied to the time delay relay TDR (line 6). When the dropper shelf reaches its most downward position, it actuates a switch LS3 (line 1) which is normally closed. Opening of switch LS3 deenergizes relay solenoid CR1 (line 1) which opens contact CR1 (line 3) whence the tray latching solenoid valve TLV is opened to retract the tray latching pneumatic cylinder 530. Retraction of the respective piston opens switch LS2 (line 4) but relay CR2 remains energized, contacts CR4 and CR2 (line 6) being closed. Shortly after the actuation of switch LS3 by the dropper shelf 512, the contact TDR of the time delay relay (line 7) closes to energize the solenoid valve VS (valve not shown) for the inductor pneumatic cylinder 382 (FIG. 15). This effects movement of the induction belts 318 against the shoe 136 of the carrier and retracts the carrier stop 322. Thus, the carrier is started in motion. Closure of contact TDR (line 7) also actuates relay CR3 (line 8) to apply power to the keying relay contacts KR1, KR2 and KR3 (lines 20, 21 and 22, respectively) through contact CR3 (line 21). The closure of the keying relay contacts energizes the respective coding unit memory setting solenoids MS1, MS2 and MS3 of a write-in device (FIG. 30) whereby coding levers thereof are raised to code the respective memory code fingers 608 (FIG. 34) of the particular carrier memory being programmed, all in accordance with the code set by the keyboard push buttons.

The coding fingers actuate the memory code fingers as the moving carrier coasts by the coding unit after having been set in motion by the inductor device.

The moving carrier actuates a stationary microswitch LS4 (line 9) subsequent to memory setting, to energize relay CR4 (line 9). Also see FIG. 1. Energization of CR4 removes power, opens the normally closed contact CR4 (line 6) and thus deenergizes relays CR2, TDR and CR3 as well as the solenoids for the valves of the shelf dropper and the inductor air cylinder and, still further, resetting the keying relays KR1, KR2 and KR3 by opening the normally closed contact CR4 (line 18). The energization of relay CR4 is quickly followed by deenergization thereof as soon as the carrier passes the microswitch LS4, thus immediately setting the system up for the next programming.

FIGS. 45–47 illustrate the wiring for three read-out switches RO1, RO2 and RO3 for different codes and it will be understood that these are two-way switches having center leaves normally biased in one direction, as shown, wherein any switch may have its center leaf disconnected from the normal contact condition shown by pushing the center leaf as by a follower 672 (FIG. 37) so that such leaf then makes contact with the leaf at its opposite side. The followers 672 are engaged by the code fingers 608 of the carriers depending upon which of such fingers have been coded in accordance with a particular code for a selected station at which the carrier is to unload, as previously explained. Thus, the connections of the switches for the first dump station is as shown in FIG. 45 wherein the binary code 1–0–0 will effect release of the tray latch via solenoid 830 (FIG. 39).

If it be assumed that switch RO–1 is moved to the upper position, the condition 1–0–1 is achieved whence an instant make delayed break solenoid TRD1 is energized to close the contact TDR1c, whereby solenoid 830 is energized. In a similar manner, the microswitches may be actuated at each dump station and the circuitry of a second read-out is shown in FIG. 46, this being for a second dump station, which is responsive to the code 1–0–0 to actuate solenoid TDR–2 which in turn energizes a solenoid such as 830 at another dump station.

The final permutation is reached at the sixth read-out, as shown in FIG. 47, where the circuitry for the microswitches is as shown for operation of solenoid 830, and this is for the track switch 12 of FIG. 2, as well as the cable release mechanism 18 of FIGS. 1 and 7.

Intermediate dump station circuits for these switches have not been shown since they are a matter of obvious arrangement to persons skilled in this field.

*The memory unit*

FIGS. 35–38 show a memory unit of a type in which three coding fingers 608 are arranged with one finger leading and two parallel trailing fingers. The microswitch array of the readout units, to be later described, has the same arrangement so that the code fingers actuate respective microswitches (FIG. 43).

It will be noted that on FIG. 8 plate 168 shows an arrangement of four code fingers F for purposes of illustration, but that any number of such fingers can be provided for binary coding, depending on the number of dump stations in the system.

The plate 168, supported by horizontal flange 132, in turn supports the pivotally mounted code fingers 608 which are integrally carried on respective yokes 612, each yoke being pivoted at 615 to the framework 620 carried by plate 168.

Any combination of fingers 608 can be coded by a coding mechanism to be hereinafter described, in such a manner that the fingers swing upwardly clockwise around their respective pivot pins 615 to take a horizontal position. The fingers are held in this coded condition by being latched as explained below.

FIGS. 36 and 37 show the mechanism details for the coding fingers in fragmentary elevation for clarity. Thus, plate 168 and attendant structure, such as the framing 620, carry a partially pivotal bar 630 which is square in cross section, as shown and pivoted at its ends between the ears 632 as on trunnions 635. The bar carries a rockable toggle lever 650 which is keyed thereto by a square aperture through which the bar passes and the toggle lever is restrained in its rocking motion along with the bar by the edges of slots 651, 654 in plate 168 through which it passes. The square shoulder of the toggle lever is biased by torsion spring 656 against the edge of slot 651, as shown in FIG. 37.

Suspended from the code finger 608 is a pivotal latch 658 pivotally connected at 662 to the finger and biased by a torsion spring 665 in a counter-clockwise direction, i.e., toward the toggle lever. The latch member 658 is provided with a notch 668 which can engage the adjacent corner 670 of the square bar to thus hold code finger 608 in horizontal position, as shown in FIG. 37. However, if toggle 650 can be engaged, as the carrier travels, by the cam edge 923 (FIG. 44), it will be rocked whence the latch is tripped and the code finger drops by gravity to the position shown in FIG. 36. Cam edge 923 is part of the code finger reset unit to be later described.

FIG. 36 shows the uncoded or unset position of the code finger which is coded by a sweeping action of the coding lever 720 of write-in or coding unit to be later described (FIG. 30). Finger 720 moving in the direction of the arrow against yoke 612 swivels the yoke to raise code finger 608 whence latch 658 catches on the corner 670 of bar 630 to produce the coded condition shown in FIG. 37.

Accordingly, as the memory moves in the direction of the arrow shown in FIG. 37, it will engage the arm 672 of a readout switch, for example, RO–3 (FIG. 39). In FIG. 37 the dotted lines indicate the switch arm position before being engaged by finger 608 and the solid line illustrates the coded finger actuating the switch in a well known manner. Where, however, the finger 608 has not been coded, it passes slightly below the switch arm, as illustrated in FIG. 36.

It will be understood that the leading code finger is latched by a bar 630 while the trailing code fingers are latched by another bar 630 (not shown). Accordingly, any number of code fingers may be latched by a single bar 630, the function of such bar being only to maintain coded position of any finger, or fingers, arranged to latch therewith. Where a plurality of such fingers latch on a single bar, one or more of such fingers may be selectively coded. However, tripping of a toggle lever 650 by the reset device permits all previously coded fingers on the respective bar to drop to uncoded position.

*Read-out unit for dump stations*

Each dump station has a read-out unit which will now be explained in conjunction with FIGS. 39–44.

Referring to FIGS. 39 and 40, the tracks $T_1$ and $T_2$ are shown from which are suspended at the side flanges at plate 803, being removably bolted thereto by any suitable wing nut and clamp arrangement generally designated as 806. There are two such clamp arrangements as seen in FIG. 39, suitably spaced in order to provide stable support for a switch housing or support framework, generally designated as 810, of rectangular construction and which houses three parallelogram linkages which form a stable and mechanically balanced switch suspension. Each parallelogram system comprises the levers 815 pivoted to the upper plate 818 of the housing and having their lower ends pivoted to a switch support plate 821. Thus the plate 821 can translate vertically with respect to plate 818, and a tension spring 824 extends diagonally between links 815 of the center parallelogram linkage biasing the plate 821 upwardly, for the purpose of providing a resilient spring suspension for this plate. Plate 821 carries three microswitchs RO–1, RO–2 and RO–3, and it will be understood that these microswitches are in parallel planes as shown in FIGS. 40 and 44 although spaced in the direction of travel of the carrier to coincide with the spacing of the fingers of the memory setting unit as shown in FIG. 44. Accordingly, it will be appreciated that as the carrier moves in the direction of the dashed arrow shown in FIGS. 39 and 44, such code fingers 608 (FIG. 37) as are in raised position actuate the corresponding microswitches via followers 672 to produce the binary code signal for energizing a solenoid 830 carried by housing 810. Plunger 834 of the solenoid actuates a toggle mechanism having levers or links 837 and 844 (see FIG. 42), against bias of spring 840. The link 844 of the toggle mechanism is articulated to a link 847 to which is keyed a shaft 850 (FIG. 43) at the bottom of which is securely fastened a trip finger 855 which, as viewed on FIG. 42 will then rotate with shaft 850 counter-clockwise. Such movement of the finger 855 projects it into the path of the tray release finger 162 (FIG. 8) as shown in FIG. 44 to effect dumping of the tray at that station in a manner heretofore explained in connection with FIGS. 8 and 9.

The mechanism provides for proper leveling of the plate 821 with respect to the code fingers 608 of the memory by means of a cam 860 fastened to plate 821 and which rides on a plate 824 of the carrier.

Attention is called to FIG. 44 which shows the memory unit just after it has passed the readout unit switches RO1, etc., illustration being diagrammatic and the plan of a solenoid 830 and the linkage operated thereby is illustrated to show the position of the dump release finger 855 just as it is engaging the tray release finger 162. The solenoid is, of course, energized at this time. The phasing is such that the code finger 608 has passed the respective microswitches, before the tray release lever engages the dump finger 855. Such phasing is for the purpose of ensuring sufficient time for the solenoid to fully actuate the toggle linkage 837–844 in order to pull it to approximately alined position so that the finger 855 will be rigidly held in order to resist the heavy force ensuing when it is struck by lever 162. The time delay of relay TDR (FIG. 33) is sufficient to maintain solenoid 830 energized while lever 162 is being actuated.

From the description herein given of the circuitry and the readout unit it will be apparent that, as has been previously mentioned, a memory unit may be used in conjunction with various types of trip and switch controls for the purpose of unclamping carriers from the power cables and switching them from one track to another. Thus, referring to FIGS. 2 and 7 in conjunction with the microswitch memory unit just described, it will be obvious that any permutation of the binary code system utilized can be established to perform cable unclamping and/or track switching. Depending upon the number of code fingers and microswitches involved in the system, one permutation can be used for cable unclamping and another permutation can be used for track switching. Alternatively, the same permutation could be used for both functions. Whether one or two permutations is used depends upon the particular track system arrangement. For example, more than two tracks may be used, in which case one permutation could be set for cable unclamping at all track switches and a respective permutation used for each track switch. It will, of course, be understood that a solenoid device such as is shown in FIG. 7 would be used for controlling the pneumatic track switch power cylinder via a suitable valve in place of the finger 855 and a read-out unit as described above used in conjunction therewith.

*The reset unit*

FIGS. 48 and 49 illustrate the reset unit which is generally of the same spring suspended plate construction as the read-out units. Thus, the track $T_1$ carries a frame 903 having three parallelogram linkages 906, the center one of which is diagonally biased by the spring 910 to give resilient suspension to a plate 915, which carries on its underside a cam 920 having the sloping face 923 disposed for engagement with the toggle elements 650 (FIGS. 36, 37) of the memory unit. The memory unit moving in the direction of the arrow shown in FIG. 48 has the two toggles in the plane of cam 920, so that when the carrier moves past the reset unit, the toggles are rotated by the edge 923 counter-clockwise to reset the code fingers 608, in a manner heretofore described in connection with FIGS. 36, 37. The memory unit is then ready to be coded once more upon passing the operator's platform.

*Pneumatic actuation system*

FIG. 50 is a block diagram presentation to illustrate the pneumatic control arrangement of the system.

Thus the various pneumatic cylinders are depicted such as cylinder 82 for any track switch, cylinder 245 for the safety brake, cylinder 315 for the inductor cylinder, 520 for the shelf drop at the operator's platform, and cylinder 530 for the tray lifting device at the operator's platform.

A compressed air source is indicated, connected to the various multi-way solenoid valves as shown, the valves connected, as will be understood, to both ends of each cylinder for effecting movement of the respective pistons in either direction. The valve symbols are shown as connected to the various legends TLV, DSV, VS and SOL. V. 1. This is illustrative of the solenoid valve actuation as heretofore explained in conjunction with FIG. 33.

Also shown on FIG. 50 are the circuitry control blocks for the various valves. For example, the track switch cylinder 82 is controlled via a read-out unit through binary switch circuitry, which in turn, controls a respective multi-way solenoid valve connected thereto. It will be clear that such solenoid valve would be operated instead of a solenoid 830 of the kind which is generally part of a read-out unit.

The safety brake cylinder 245 is controlled via automatic control circuitry responsive to the switches S1 and S2 on the branch track B of FIG. 1. The keyboard control circuitry block is shown as embracing, via phantom lines, the various solenoid valves, the operation of which is explained in conjunction with the circuitry diagram of FIG. 33.

*Operation*

The invention has been described by way of a combination of various units and components, such as superimposed track means, tow cables, switch junctions and actuation, control circuitry, coding unit, memory unit, read-out unit, reset unit, etc., all of which may be utilized in an infinite variety of combinations to suit any given sorting system for a warehouse, post office, or the like.

As to the operation of the system disclosed:

Assuming an operator is standing on the platform 500 (FIG. 24) and a load (not shown) such as a sack of mail, has been delivered to the shelf 508, he would manually slide such sack onto the dropper shelf 512. At this time a number of carriers are backed up to his right (FIG. 1) in the stowage area 36, abutting each other and cushioned from each other by resiliently mounted bars 128 (FIG. 8) there being one such carrier directly in front of him awaiting loading.

The tray 115 of that carrier is in upward position (FIG. 25) having been placed thereby cylinder 530 when the carrier actuated the switch LS1 (FIGS. 1 and 33) in coasting from the stowage area to the operator's platform, for loading.

The carrier is held in stationary position by the edge 173a of the stop plate 173 (FIG. 18a) which abuts the inductor stop finger 322 (FIG. 17), and is now ready to receive the mail sack.

The operator programs the keyboard to set the coding unit levers (FIG. 30) for a particular destination, and automatically when the first key is pressed, pneumatic cylinder 520 retracts to drop shelf 512 and the sack then falls into the tray 115. Shelf 512 actuates switch LS3 (FIGS. 25 and 33) thus retracting tray lift cylinder 530. As cylinder 530 retracts it opens switch LS2. Then by action of the circuitry of FIG. 33 the inductor stop finger 322 is withdrawn and the belts 318 of the inductor (FIG. 15) are deflected to engage the carrier shoe 136 (FIGS. 9 and 18a) thus imparting motion to the carrier, which then passes the coding unit (FIG. 1). This sets the memory code fingers (FIG. 37), the carrier subsequently passing and actuating switch LS4 (FIGS. 1 and 33) at the jog section 61, such switch actuation de-energizing various solenoids and resetting the keying relays. The clamp bars 178 and 180 (FIG. 10) now come astraddle the cable C to grip thereon as the cam end 178a rides on the fixed cam 24 (FIGS. 1 and 29).

The carrier is thus towed around the track system until it reaches a read-out unit having binary circuitry responsive to the setting of the memory code fingers. This may be a dump point or it may be a switch junction and a subsequent dump point. In any event, the carrier returns for reloading via Track A or Track B (FIG. 1) on a coasting portion (30, 33) after being released from the respective cable by means of the fixed finger 27 (FIGS. 1 and 6) acting against the release button 238 (FIG. 10). Finally, the carrier reaches the reset unit 40 (FIGS. 1 and 48) which resets the memory code fingers and the carrier is now once more in the stowage area 36 abutting the next downstream carrier and awaiting its turn to arrive at the operator's platform for reloading.

Of special significance in the course of operation is the fact that a read-out unit, such as shown in FIGS. 39 through 44, may be utilized as the tray release control at any dump point or for operating a clamp release finger, as shown in FIG. 7, prior to a switch junction 12, or for controlling actuation of a pneumatic cylinder 82 for actuating a track switch tongue, as shown in FIGS. 2 and 3, via a solenoid valve, as illustrated in FIG. 50. Further, a single code setting of the memory unit can control the clamp release mechanism 18, the track switch 12, and dumping at the station 4 or 5, all as depicted on FIG. 1. The specific placement of the read-out units is, of course, a matter of design of the system. Similarly, the same code setting that controls dumping at points 4 or 5 could also control switch actuation of the switch junction 10, it being understood that a read-out unit would be located adjacent such junction, as in the case of the junction 12, or the clamp release 18.

All essential components of the invention have been described in sufficient detail to enable anyone skilled in the art to construct a system to a given specification. It will be appreciated that a wide variation in design of components and units is possible. Accordingly, it is not desired to limit the invention to the precise illustrations disclosed except as set forth in the following claims.

What is claimed is:

1. In a conveying and sorting system a pair of track means disposed for supporting load carriers for movement, a track switch junction joining said track means, means whereby a carrier approaching said track switch junction is stopped in the event that a carrier on the other track means is approaching said junction, said means comprising a pair of electrical switch members adjacent one track means and spaced therealong upstream of said track switch junction and operable by said carrier in sequence, and a brake device adjacent the other track means and upstream of said track switch junction, and circuitry means responsive to operation of the upstream electrical switch member by a carrier on said one track means to actuate the brake device, said circuitry means having a delay characteristic wherein said operation of the downstream electrical switch member effects a time delay to permit a carrier on said other track means to pass said switch junction while a carrier on the other track is halted, said switch junction having a movable switch tongue and means for effecting movement of said tongue, the said means being coordinated with said brake device so that said tongue is held in a track switching position while said brake device is in actuated condition.

2. In a conveying and sorting system, a track means and a load carrier suspended therefrom and movable therealong, a cable associated with said track means, releasable means for connecting said carrier to said cable to be pulled thereby along said track when so connected, a loading station adjacent said track at which said carrier is loaded, an actuator means adjacent said loading station for actuating said connecting means to grip said cable, an inductor means adjacent said loading station and disposed to be engageable with said carrier to impart movement thereto from a stationary loading condition, said inductor means comprising a moving belt, a supporting framework means for said belt and means for actuating said framework means to move said belt transversely to the direction of travel thereof into engagement with said carrier.

3. In a conveying and sorting system, a track means and a load carrier suspended therefrom and movable therealong, a cable associated with said track means, releasable means for connecting said carrier to said cable to be pulled thereby along said track when so connected, a loading station adjacent said track at which said carrier is loaded, an actuator means adjacent said loading station for actuating said connecting means to grip said cable, an inductor means adjacent said loading station and disposed to be engageable with said carrier to impart movement thereto from a stationary loading condition, said inductor means comprising a moving belt, a supporting framework for said belt and having a pivotal portion, and means for actuating said pivotal portion to dispose said belt into engagement with said carrier, said belt having an end loop passing around said pivotal portion of said framework.

4. In a conveying and sorting system, a track means and an associated tow cable, a load carrier movable along said track means and having a clamp device to be clamped to said cable, a loading station structure adjacent said track means at which said carrier is loaded while stationary and an operator programmed coding unit adjacent said station structure, said structure having load dropping means for dropping a load into said carrier subsequent to programming of said coding unit, inductor means comprising a moving belt adjacent said loading station, a supporting framework means for said belt and means for actuating said framework means to move said belt transversely to the direction of travel thereof into engagement with said carrier to impart coasting movement thereto subsequent to a load being dropped into said carrier, actuator means downstream of said inductor means to actuate said clamp device to grip said tow cable subsequent to a coasting movement being given to said carrier by said inductor means.

5. In a system as set forth in claim 4, said load dropping means comprising a movable load support shelf having one position for receiving a load and a subsequent position for dropping said load into said carrier, and circuitry means responsive to movement of said shelf to effect operation of said inductor means.

6. An inductor device disposed adjacent a conveyor system wherein said system comprises a stationary carrier, and said inductor device being engageable with said stationary carrier to impart a coasting movement thereto, said inductor device comprising a moving belt, a supporting framework means for said belt and means for deflecting a portion of said belt transversely to the direction of travel thereof to dispose said belt into engagement with said carrier.

7. A device as set forth in claim 6, a motor carried by said framework, said belt comprising a continuous loop driven by said motor, said framework having a pivotal section encompassed by a portion of said belt, and means for swinging said pivotal section to effect engagement of said belt portion with said carrier.

8. A device as set forth in claim 7, said carrier having an element of predetermined length engageable by said belt portion, the remainder of said belt having a portion in the plane of movement of said element and downstream of the pivotal section of said framework and disposed so as to normally not engage said element until said carrier is moved to effect engagement therebetween.

9. An inductor device engageable with a stationary carrier to impart a coasting movement thereto comprising a moving belt, a supporting framework means for said belt and means for deflecting a portion of said belt to dispose said belt into engagement with said carrier, a motor carried by said framework, said belt comprising a continuous loop driven by said motor, said framework having a pivotal section encompassed by a portion of said belt, and means for swinging said pivotal section to effect engagement of said belt portion with said carrier, said carrier having an element of predetermined length engageable by said belt portion, the remainder of said belt having a portion in the plane of movement of said element and downstream of the pivotal section of said framework and disposed so as to normally not engage said element until said carrier is moved to effect engagement therebetween, said device having a stop finger to engage a carrier approaching from upstream of the path of motion to be imparted by said device, said stop finger being disposed to hold said carrier stationary, said stop finger being movable to release said carrier, and stop finger actuating means for actuating said stop finger to release said carrier substantially at the time of swinging of said pivotal section of said framework.

10. A device as set forth in claim 9, said stop finger and said stop finger actuating means being carried by said framework pivotal section and comprising means connected thereto and to said framework and to said stop finger for actuating said stop finger responsive to swinging of said pivotal section.

11. In a system of the kind described, a track means, a carrier supported thereby and movable therealong, a tow cable associated with said track means, and means for clamping said carrier to said cable to effect movement of said carrier on said track means, a loading device for loading cargo into said carrier, said carrier having a tray pivotally mounted so as to swing upwardly for receiving a load and downwardly to discharge said load, said loading device having power means actuatable to move said tray from a downward to an upward position, said loading device having a shelf on which a load may be initially placed in preparation for dropping into said tray, power means for raising and lowering said shelf to respectively support and drop loads, circuitry means for controlling the operation of both of said power means responsive to operator keyboard control.

12. In a system of the kind described, a track means, a carrier supported thereby and movable therealong, a loading device for loading cargo into said carrier, said carrier having a tray pivotally mounted so as to swing upwardly for receiving a load and downwardly to discharge said load, said loading device having a first power means engageable with said tray to move said tray from a downward to an upward position, said loading device having a movable shelf on which a load may be initially placed in preparation for placing said load into said tray, a second power means for moving said shelf to respectively support and place loads in said tray.

13. In a system as set forth in claim 12, said loading structure having a platform to support an operator while handling loads, and having a fixed shelf structure for initially receiving loads and slidably supporting said loads to said movable shelf.

14. In a conveying and sorting system a track means and a load carrier carried thereby and movable therealong, a loading station adjacent said track means and comprising a droppable shelf on which a load may be initially placed when said shelf is in a raised position and which will effect dropping of said load into said carrier when said shelf is in a lowered position, said carrier having a tray disposed in a first position to receive and carry a load and releasable to a lower position to drop said load at a point along the length of said track means, and said carrier having means for latching said tray in load receiving position, a platform on which an operator stands while placing a load on said droppable shelf, and a structure for supporting said platform, said droppable shelf being above said platform, and a tray actuating device carried by said structure for moving said tray from a lower position to load receiving position.

References Cited by the Examiner

UNITED STATES PATENTS

| | | | |
|---|---|---|---|
| 294,322 | 2/1884 | Judge | 104—191 |
| 396,054 | 1/1889 | Snyder | 104—191 |
| 640,934 | 1/1900 | Painter | 214—43 |
| 946,282 | 1/1910 | Snyder et al. | 198—109 |
| 1,297,680 | 3/1919 | Hanak | 104—88 |
| 2,410,051 | 10/1946 | Deakin | 214—60 |
| 2,714,355 | 8/1955 | Benson | 104—88 |
| 2,751,091 | 6/1956 | Freeman | 214—60 X |
| 2,803,333 | 8/1957 | Freeman | 198—38 |
| 2,875,703 | 3/1959 | Bishop et al. | 104—88 |
| 2,894,460 | 7/1959 | Klamp | 104—88 |
| 2,918,881 | 12/1959 | Klamp et al. | 104—88 |
| 2,940,400 | 6/1960 | Harrison | 104—88 |
| 2,955,544 | 10/1960 | Goirand | 104—206 X |
| 3,021,967 | 2/1962 | Patzold et al. | 214—11 |
| 3,140,669 | 7/1964 | Parker | 104—88 |
| 3,153,705 | 10/1964 | Rosenberg | 200—18 |
| 3,160,729 | 12/1964 | Lapham | 200—153 |
| 3,200,933 | 8/1965 | Schenk et al. | 214—11 X |
| 3,214,003 | 10/1965 | Wilson | 214—11 X |

FOREIGN PATENTS

| | | |
|---|---|---|
| 1,237,106 | 6/1960 | France. |

MARVIN A. CHAMPION, *Primary Examiner.*

MORRIS TEMIN, *Examiner.*